(12) United States Patent
Bennett et al.

(10) Patent No.: US 9,529,109 B2
(45) Date of Patent: Dec. 27, 2016

(54) METHODS AND APPARATUS FOR DETERMINING SLOWNESS OF WAVEFRONTS

(75) Inventors: Nicholas N. Bennett, Hamden, CT (US); Richard T Coates, Katy, TX (US); Jakob Brandt Utne Haldorsen, Nesbru (NO); Douglas E. Miller, Boston, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 912 days.

(21) Appl. No.: 13/541,752

(22) Filed: Jul. 4, 2012

(65) Prior Publication Data

US 2014/0010045 A1    Jan. 9, 2014

(51) Int. Cl.
*G01V 1/50*    (2006.01)

(52) U.S. Cl.
CPC ............ *G01V 1/50* (2013.01); *G01V 2210/52* (2013.01); *G01V 2210/6222* (2013.01)

(58) Field of Classification Search
CPC .................. G01V 2210/6222; G01V 2210/52; G01V 1/50
See application file for complete search history.

(56) References Cited

U.S. PATENT DOCUMENTS

| 4,594,691 | A |   | 6/1986  | Kimball et al. |
| 4,698,793 | A | * | 10/1987 | Wu ................................ 367/32 |
| 5,081,611 | A | * | 1/1992  | Hornby ..................... G01V 1/50 367/25 |
| 6,308,137 | B1 |  | 10/2001 | Underhill et al. |
| 6,839,633 | B1 |  | 1/2005  | Basaki et al. |
| 6,956,790 | B2 |  | 10/2005 | Haldorsen |
| 7,035,165 | B2 |  | 4/2006  | Tang |
| 7,492,664 | B2 |  | 2/2009  | Tang et al. |
| 7,672,193 | B2 |  | 3/2010  | Basaki |
| 2009/0070042 | A1 | * | 3/2009  | Birchwood .............. G01V 1/50 702/11 |
| 2009/0236145 | A1 |  | 9/2009  | Bennett et al. |
| 2011/0019501 | A1 |  | 1/2011  | Market |
| 2012/0069713 | A1 | * | 3/2012  | Geerits et al. .................. 367/99 |

OTHER PUBLICATIONS

Burnett, William, and Sergey Fomel. "3D velocity-independent elliptically anisotropic moveout correction." Geophysics 74.5 (Sep. 28, 2009): WB129-WB136. http://library.seg.org/doi/abs/10.1190/1.3184804.*

J. Haldorsen, W. Borland, H.A.B. Al Rougha, A. Sultan, R. Meehan, "Azimuthal Sonic Imaging," Extended Abstract, 67th Mtg, 2005, Eur Assn. Geosci. Eng., paper I-017, Madrid.

(Continued)

*Primary Examiner* — Daniel L Murphy
(74) *Attorney, Agent, or Firm* — Daryl R. Wright; Jody Lynn DeStefani

(57) ABSTRACT

Methods and apparatus for determining slowness of wavefronts. An example apparatus includes one or more sources spaced from a receiver. The one or more sources are to transmit one or more signals and the receiver is to receive at least a portion of the one or more signals. The apparatus includes a processor to process waveform data associated with the one or more signals by stacking waveforms of the waveform data based on to linear moveout and sinusoidal moveout.

19 Claims, 27 Drawing Sheets

(56) References Cited

OTHER PUBLICATIONS

A. Brie, F. Pampuri, A. Marsala, O. Meazza, "Shear Sonic Interpretation in Gas-Bearing Sands," SPE 30595, SPE Annual Technical Conference and Exhibition, Dallas, Oct. 1995.

L. Hsieh, "New seismic while drilling systems may help operators navigate complex well paths", Drilling Contractor, Jul./Aug. 2010.

C. Esmersoy, C. Chang, M. Kane, R. Coates, B. Tickelaar, E. Quint, "Acoustic imaging of reservoir structures from a horizontal well", The Leading Edge, vol. 17,. 940-946.

Q. Li, D. Omeragic, L. Chou, L. Yang, K. Duong, J. Smits, T. Lau, C.B. Liu, R. Dworak, V. Dreuillault, J. Yang, and H. Ye, et. al.: "New directional electromagnetic tool for proactive geosteering and accurate formation evaluation while drilling," paper presented at the 46th SPWLA Annual Symposium, New Orleans, LA, pp. 26-29, Jun. 2005.

D. Omeragic, T. Habashy, C. Esmersoy, Q. Li, J. Seydoux, J. Smits, and J.R. Tabanou, "Real-Time Interpretation of Formation Structure From Directional EM Measurements," paper presented at the 47th SPWLA Annual Symposium, Veracruz, Mexico, pp. 4-7, Jun. 2006.

A. Brie, F. Pampuri, a. Marsala, 0. Meazza, "Shear Sonic Interpretation in Gas-Bearing Sands," SPE 30595, SPE Annual Technical Conference and Exhibition, Dallas, Oct. 1995.

Aron, J, Chang, S.K., Dworak, R., Hsu, K., Lau, L., Plona, T.J., Masson, JP, Mayes, J., McDaniel, G., Randall, C., and Kostek, S., "Sonic compressional measurements while drilling", SPWLA 35th Logging Symposium, paper SS pp. 1-12, 1994.

C. Kimball, T. Marzetta, "Semblance Processing of borehole acoustic array data", Geophysics, vol. 49, No. 3, Mar. 1984.

L. Hsieh, "New seismic while drilling systems may help operators navigate complex well paths", Drilling Contractor, Jul.-Aug. 2010.

J. Haldorsen, D. Johnson, T. Plona, B. Sinha, H.P. Valero, K. Winkler, "Borehole Acoustic Waves", Oilfield Review, Spring 2006.

Tang, X. M., 2004, "Imaging near-borehole structure using directional acoustic-wave measurement", Geophysics, 69, 1378-1386.

Haldorsen J., Voskamp A., Thorsen R., Vissapragada B., Williams S., and Fejerskov M., 2006,"Borehole Acoustic Reflection Survey for High Resolution Imaging," 76th Annual International Meeting, SEG, Expanded Abstracts, 314-317.

F. Song and M.N. Toksoz, "Model Guided Geosteering for Horizontal Drilling", 2009, preprint available at http://www-eaps.mit.edu/erl/Song_2009-2.pdf.

S. Bose, H-P. Valero, A. Dumont, "Semblance Criterion Modification to Incorporate Signal Energy Threshold," SEG Houston 2009 International Exposition and Annual Meeting, pp. 376-380.

C. Esmersoy, C. Chang, M. Kane, R. Coates, B. Tickelaar, E. Quint, "Acoustic imaging of reservoir structures from a horizontal well", The Leading Edge, vol. 17, 940-946.

F. Zhu, D. Alexander, P. Goossens, H. Kurniawan, W. Borland, J. Edwards, First Sonic Imaging AVA:, 77th Ann. Internat. Mtg., Soc. Expl. Geophys., Extended Abstracts, 2007. pp. 538-541.

N. Hirabayashi, W.S. Leaney, J.B..U. Haldorsen, "Wavefield separation for borehole acoustic reflection surveys using parametric inversion," 78th Ann. Internat, Mtg., Soc. Expl. Geophys., Extended Abstract pp. 344-348.318.

B.E. Hornby, "Imaging of near-borehole structure using full-waveform sonic data," Geophysics, vol. 54, No. 6, Jun. 1989, pp. 747-757.

W. Maia, R. Rubio, F. Junior, J. Haldorsen, R. Guerra, C. Dominguez, "First Borehole Acoustic Reflection Survey Mapping a Deepwater Turbidite Sand," SEG Expanded Abstracts 25, New Orleans 2006 Annual Meeting, pp. 1757-1761.

"Space Filing Polyhedron", at http://mathworld.wolfram.com/Space-FilingPolyhedron.html.

C.P. Ursenback, "Generalized Gardner Relations," SEG Expanded Abstracts 21, SEG Int'l Exposition and 72nd Annual Meeting, Utah, Oct. 6-12, 2002. pp. 1885-1888.

J.P. Castagna, Amplitude-versus-offset analysis; tutorial and review; in J.P. Castagna and M.M. Backus, Eds., Offset-Dependent Reflectivity—Theory and Practice of Avo Analysis, Society of Exploration Geophysicists.

B.E. Hornby, "Tomographic reconstruction of near-borehole slowness using refracted borehole sonic arrivals," Geophysics, vol. 58, No. 12, 1993, pp. 1726-1738.

R. Coates, M. Kane, C. Chang, C. Esmerson, M. Fukuhara, H. Yamamoto, "Single-well Sonic Imaging: High-Definition Reservoir Cross-sections from Horizontal Wells," SPE/Petroleum Society of CIM International Conference on Horizontal Well Technology, Nov. 2000.

J. Haldorsen, W. Borland, H.A.B. Al Rougha, A. Sultan, R. Meehan, "Azimuthal Sonic Imaging," Extended Abstract, 67th Mtg, 2005, Eur Assn. Geosci. Eng., paper 1-017, Madrid.

\* cited by examiner

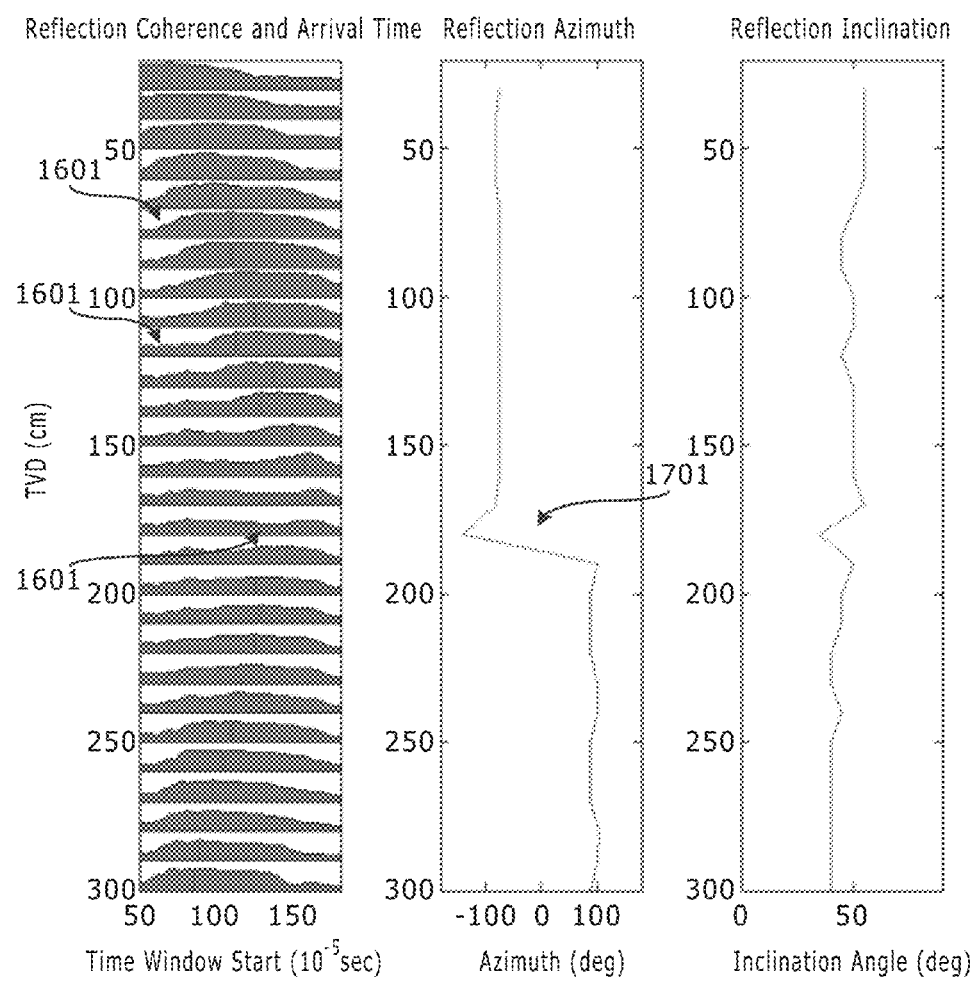

ated tool sonde in a borehole with acoustic receiver sensors distributed around the tool sonde and the relative orientation of a single dipole source firing.

METHODS AND APPARATUS FOR DETERMINING SLOWNESS OF WAVEFRONTS

BACKGROUND

Determining slowness of a wavefront as the wavefront propagates along a length of a receiver array is used for various well placement and reservoir characterization tasks.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An example method includes transmitting signals from a plurality of sources. The sources are spaced from an array of receivers of the downhole tool. The receivers are spaced around a circumference of the downhole tool. The method also includes obtaining waveform data associated with the signals received at one or more of the receivers and processing the waveform data to determine three-dimensional slowness-time coherence representation of the waveforms.

An example method includes transmitting a signal from a monopole source. The monopole source is spaced from an array of receivers of the downhole tool. The receivers are spaced around a circumference of the downhole tool. The method also includes obtaining waveform data associated with the signal received at one or more of the receivers and filtering the waveform data to substantially remove data associated with direct arrivals. The method also includes processing the filtered waveform data to determine three-dimensional slowness-time coherence representation of the waveforms and parameters of one or more non-direct wavefronts.

An example apparatus includes one or more sources spaced from a receiver. The one or more sources are to transmit one or more signals and the receiver is to receive at least a portion of the one or more signals. The apparatus includes a processor to process waveform data associated with the one or more signals by stacking waveforms of the waveform data based on linear moveout and sinusoidal moveout.

FIGURES

Embodiments of methods and apparatus for determining the slowness of a wavefront are described with reference to the following figures. The same numbers are used throughout the figures to reference like features and components.

Figure 6:
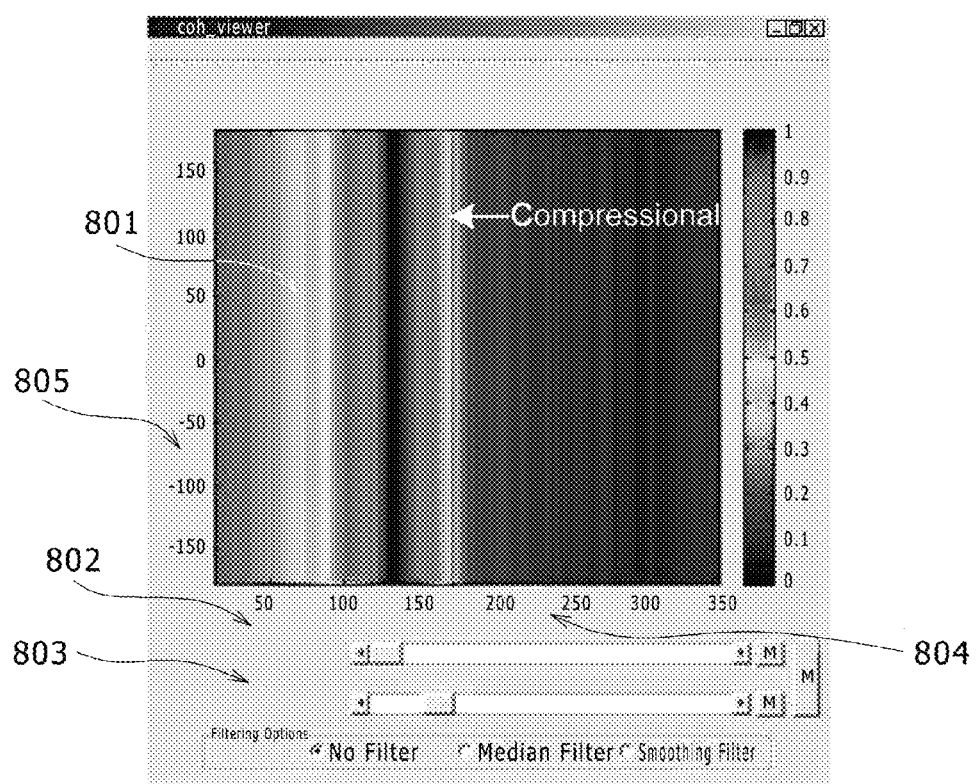
Figure 7:
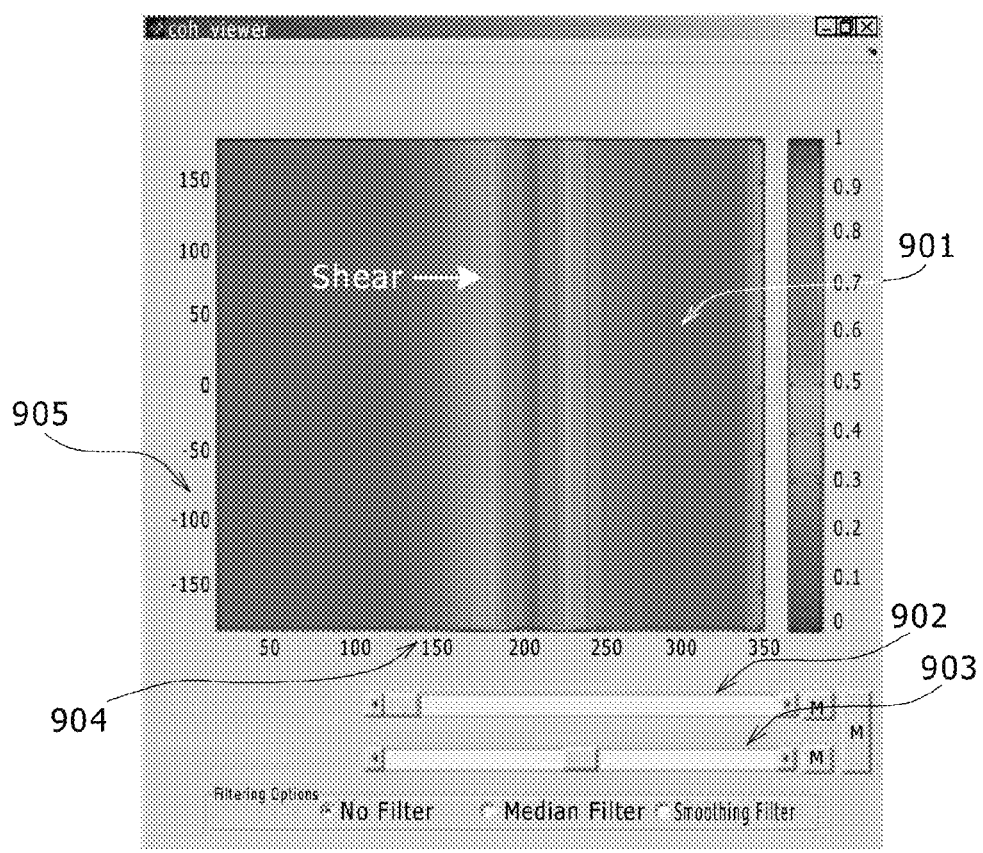
Figure 8:
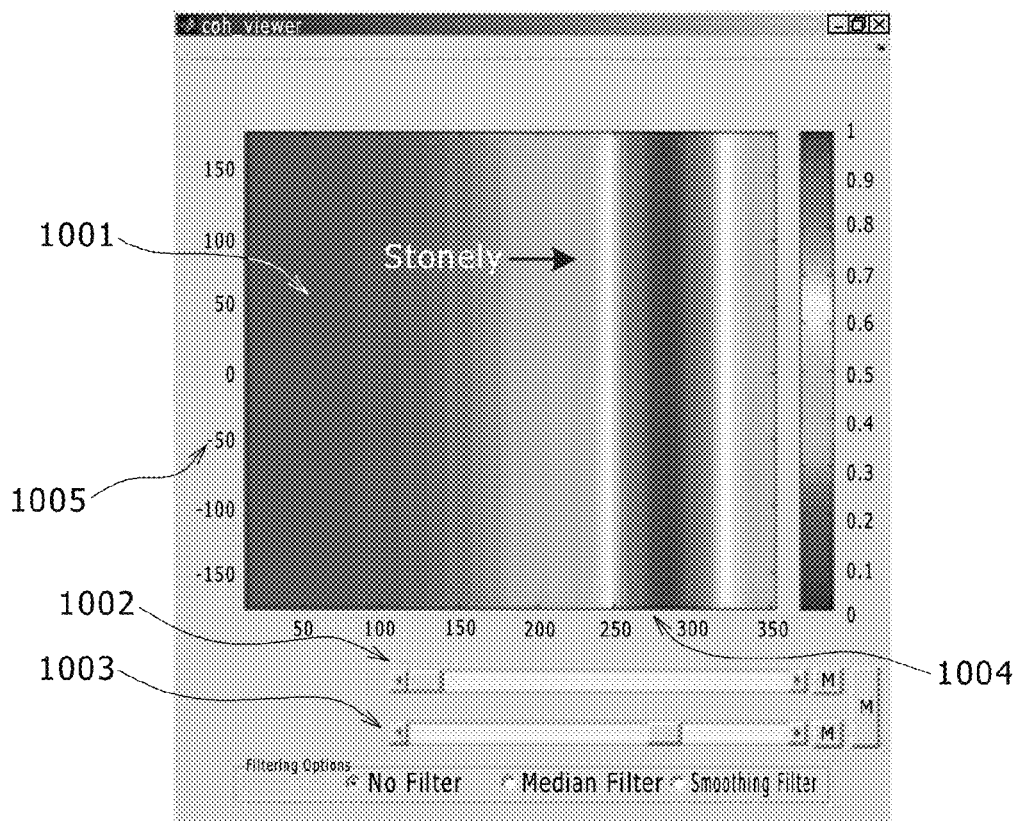
Figure 9:
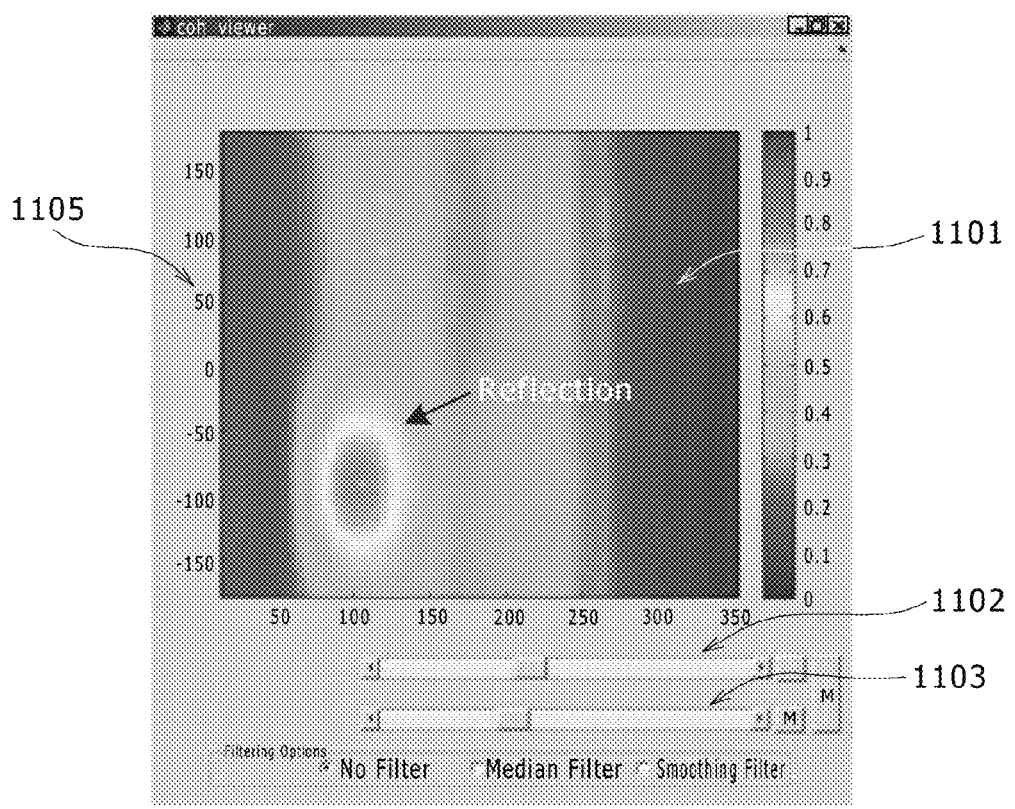

FIGS. 6, 7, 8, and 9 represent 2D slices of a 3D slowness time coherence array as depicted using a 2D viewer application. FIGS. 6, 7, and 8 depict direct borehole-borne arrival events, while FIG. 9 depicts a non-direct reflected wavefront arrival.

Figure 10:
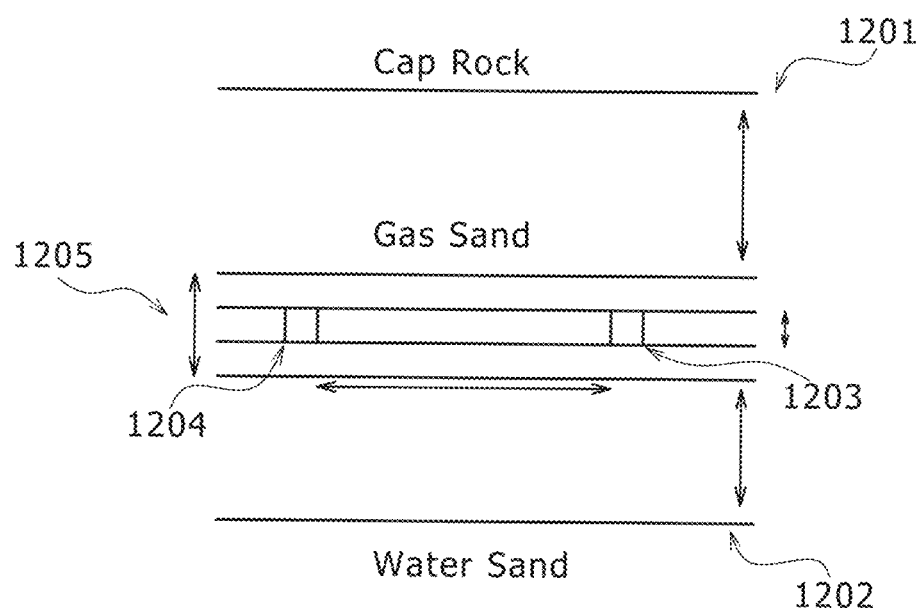

FIG. 10 depicts an Earth formation with two layer boundaries, a borehole, and sonic logging device.

Figure 11:
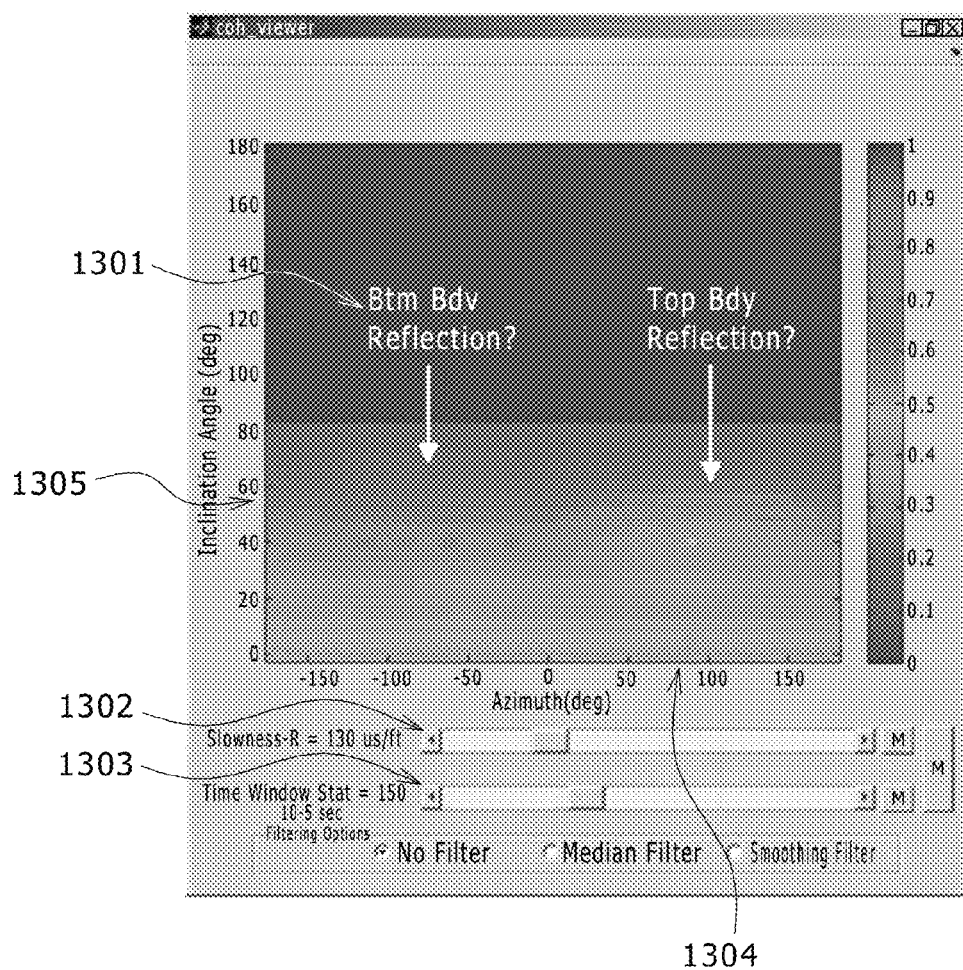
Figure 12:
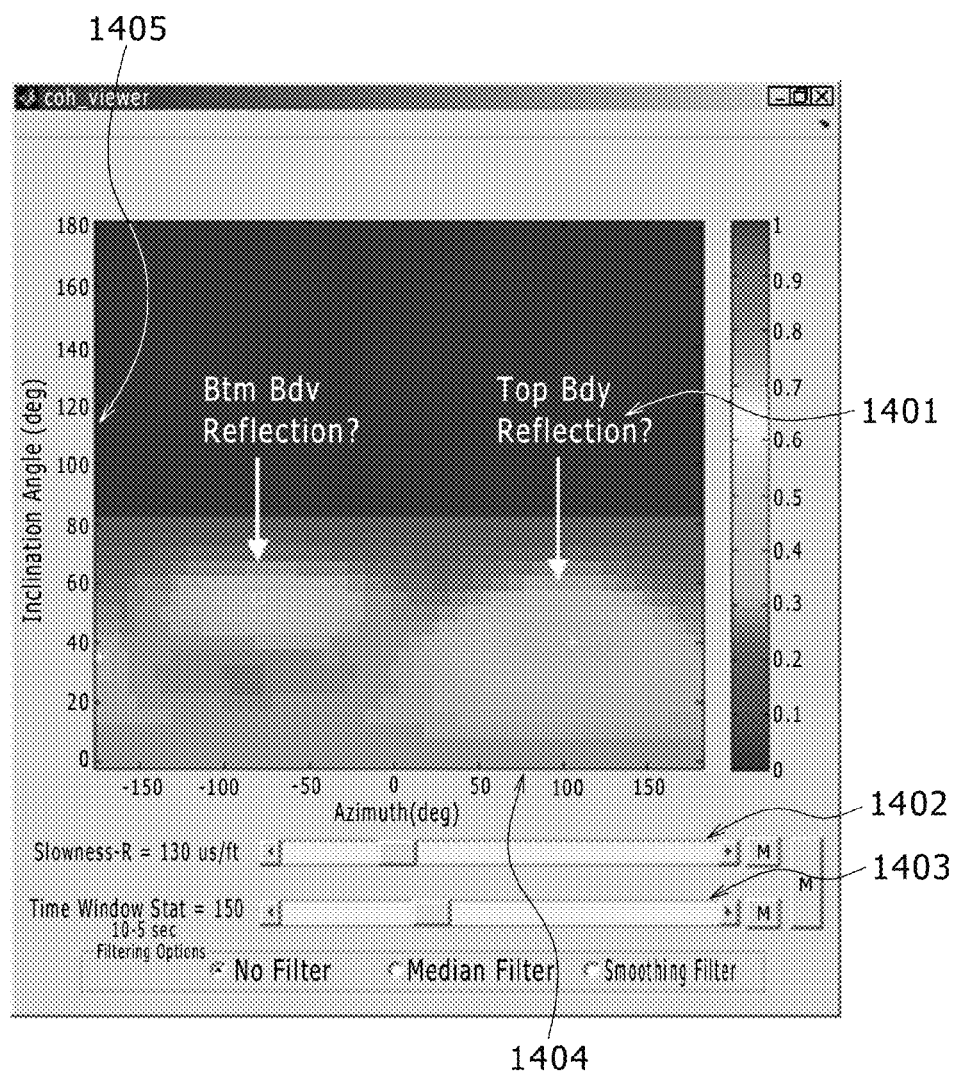
Figure 13:
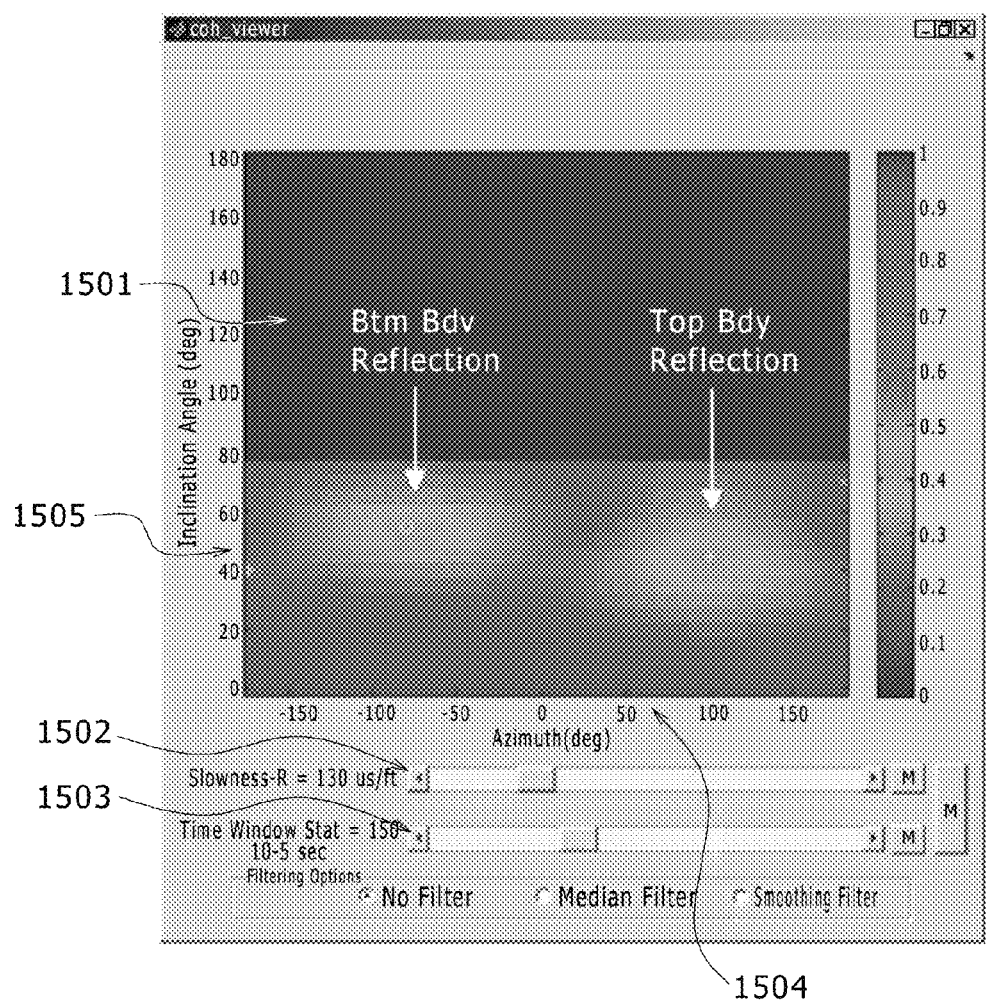

FIGS. 11, 12, and 13 depict results of using a CSG filtering technique to remove interference of borehole-borne direct arrival events.

FIGS. 14, 15, and 16 are logs of parameters automatically extracted from 3D slowness time coherence representations of waveforms produced using monopole sources and collected by a sonic logging device at different depth positions between, for example, the two boundaries depicted in FIG. 12.

Figure 17:
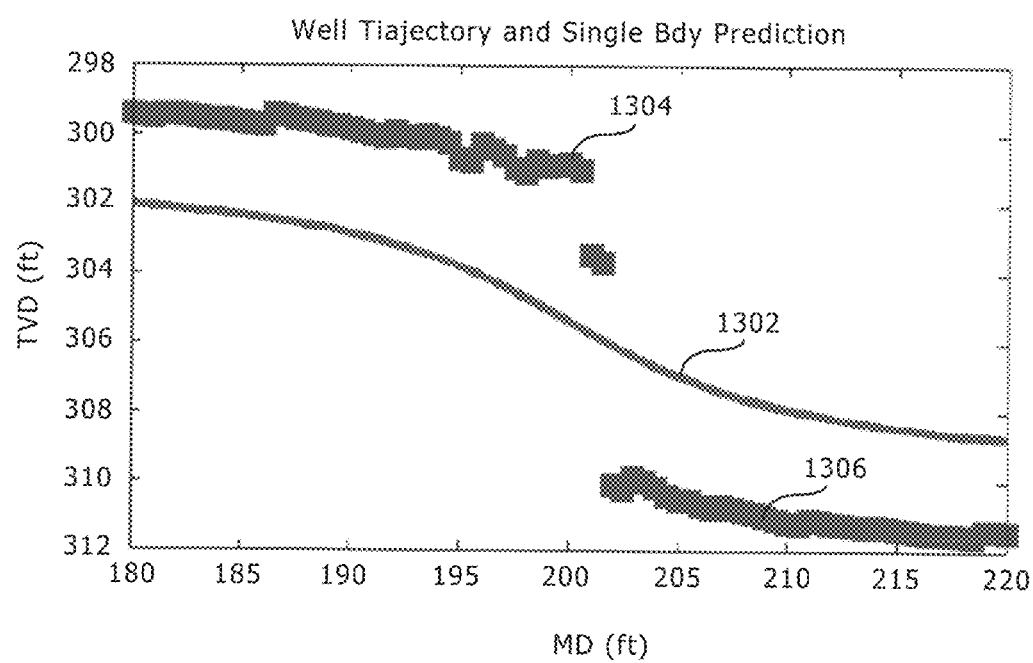

FIG. 17 depicts a curtain plot produced by a ray-tracer using the logs depicted in FIGS. 14, 15, and 16.

Figure 18:
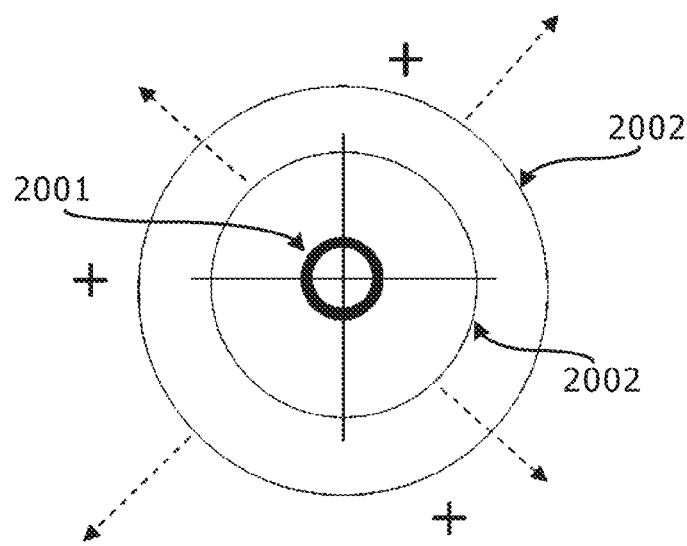
Figure 19:
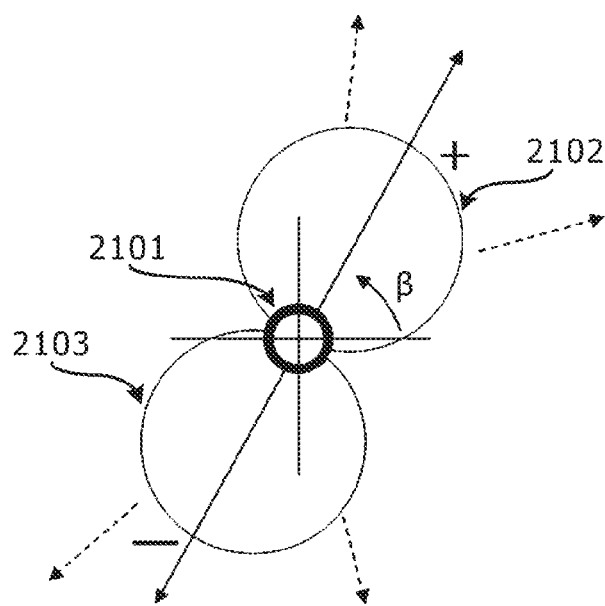

FIGS. 18 and 19 depict the wavefronts transmitted by a monopole and dipole source, respectively.

Figure 20:
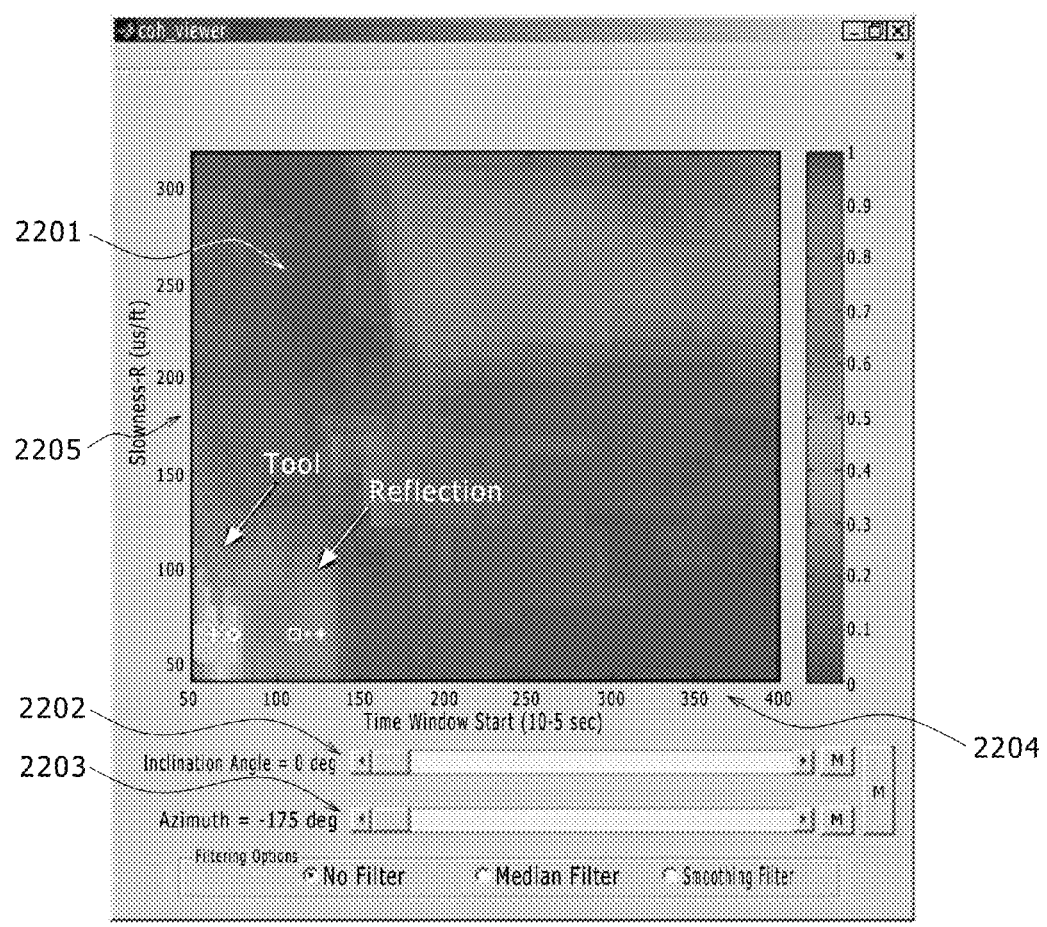

FIG. 20 depicts the results of applying the 1D slowness time coherence algorithm to waveforms obtained using a dipole source.

Figure 21:
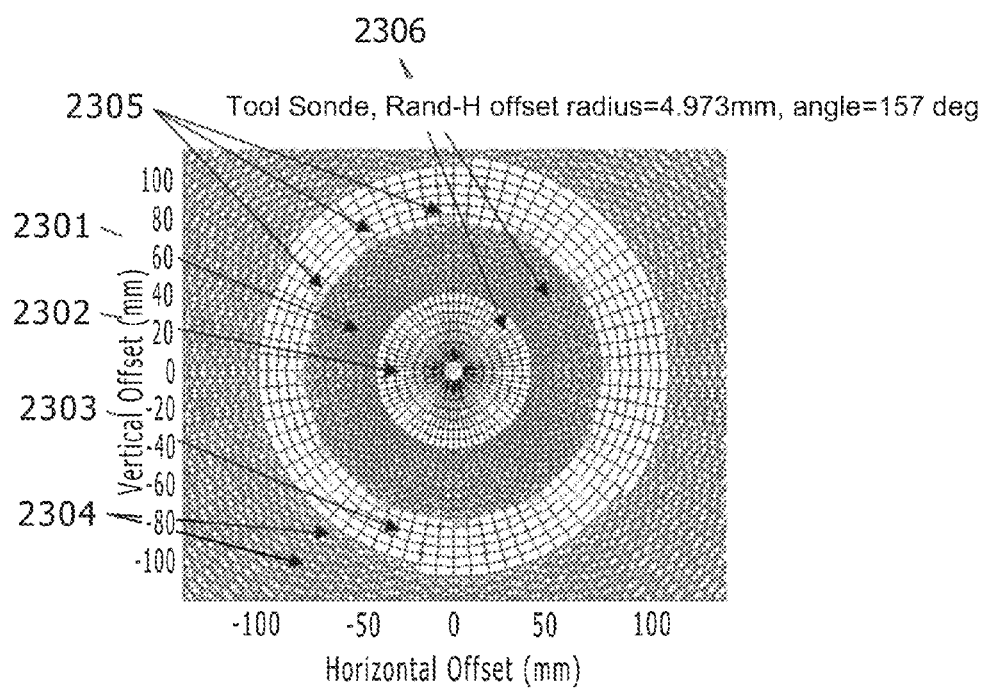

FIG. 21 illustrates a finite difference model of an eccentered tool sonde in a borehole with acoustic receiver sensors distributed around the tool sonde and the relative orientation of a single dipole source firing.

Figure 22:
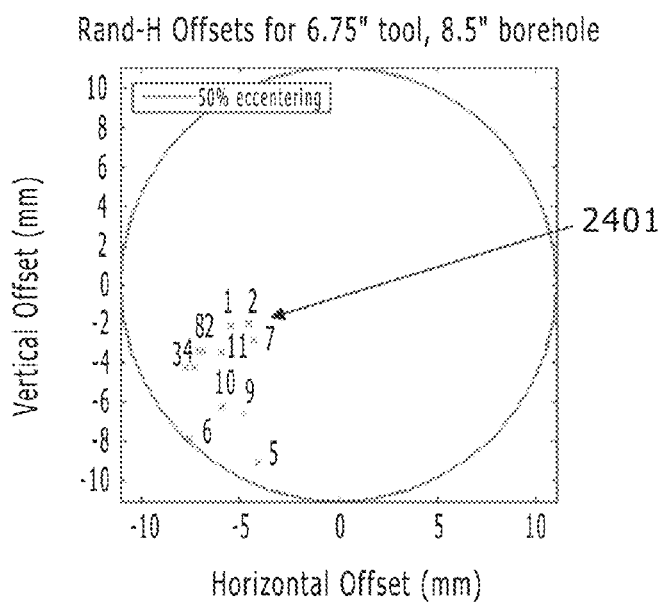

FIG. 22 describes a tool sonde eccenterings and dipole source orientations associated with finite difference models such as that depicted in FIG. 21.

Figure 23:
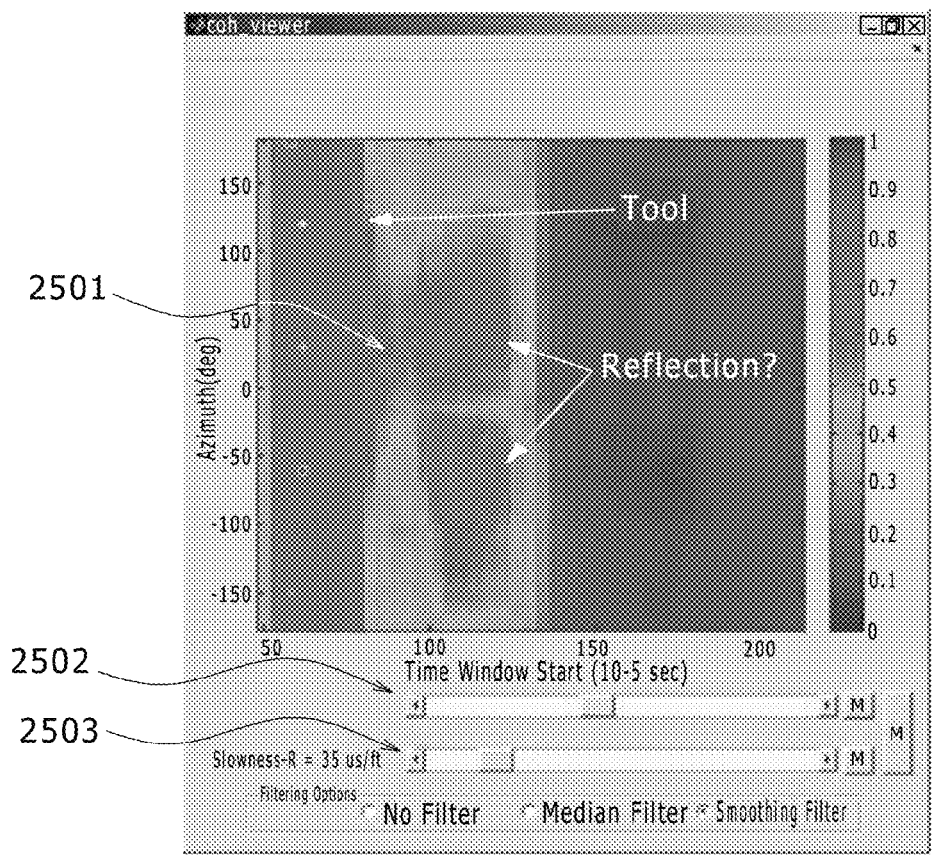

FIG. 23 represent a 2D slice of the 3D slowness time coherence array for waveforms generated according to the finite difference model depicted in FIG. 21.

Figure 24:
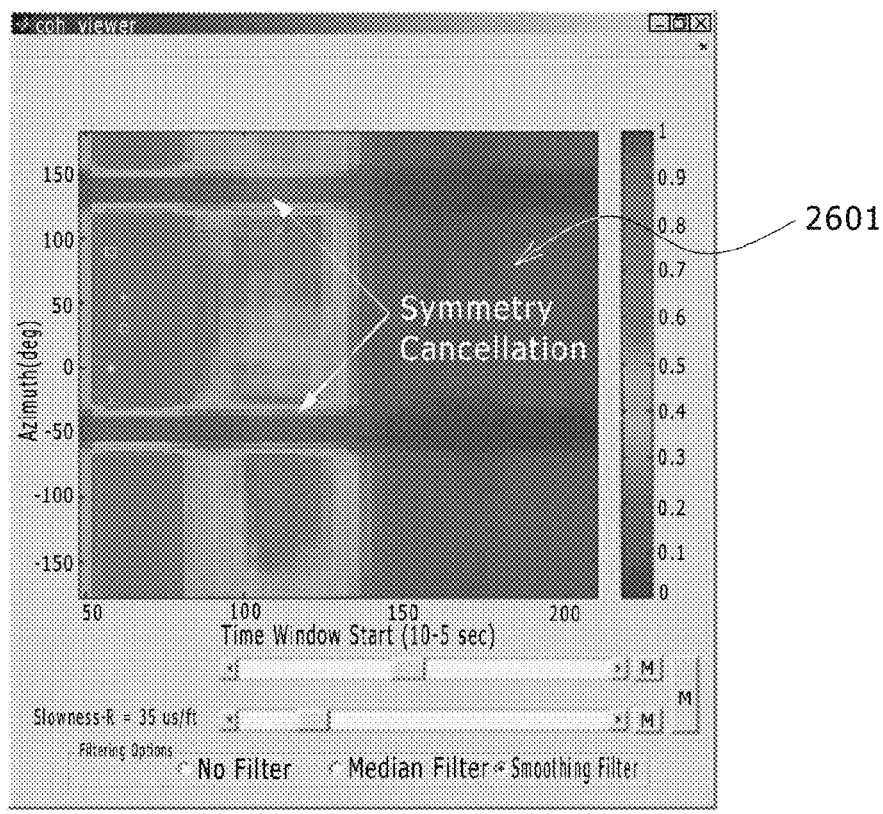
Figure 25:
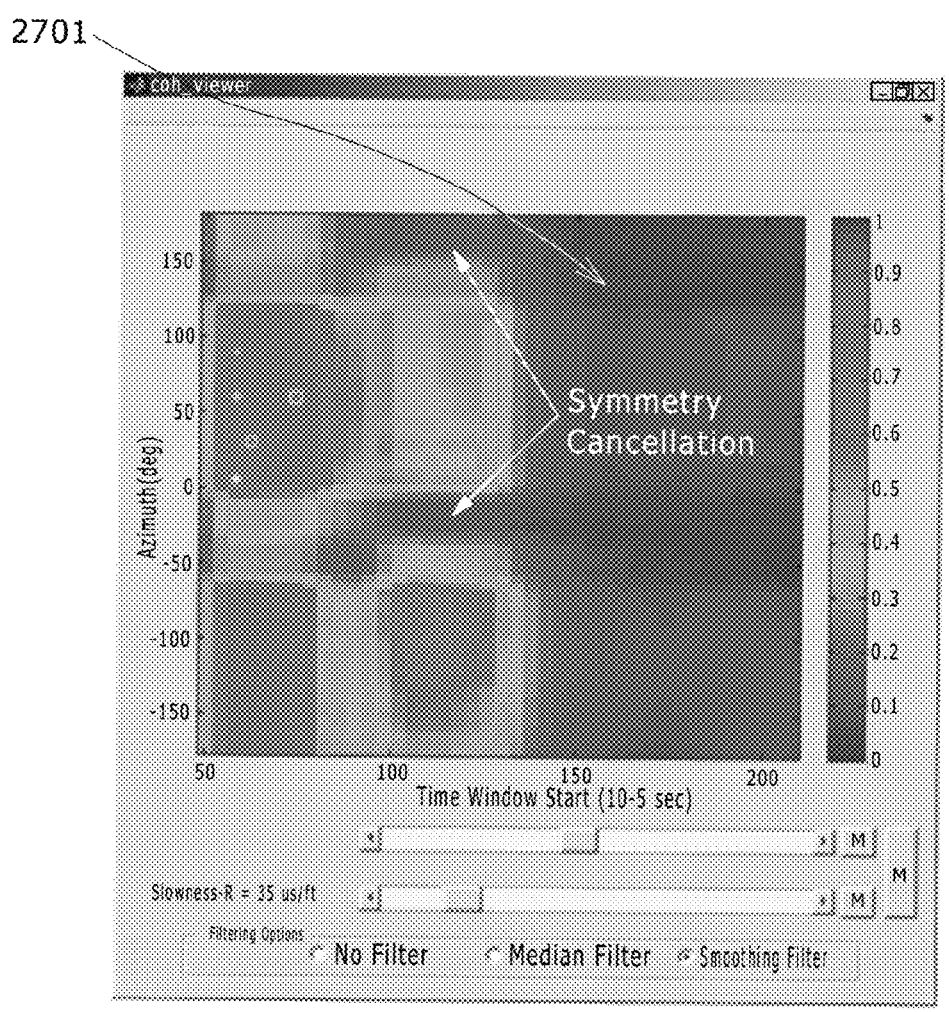
Figure 26:
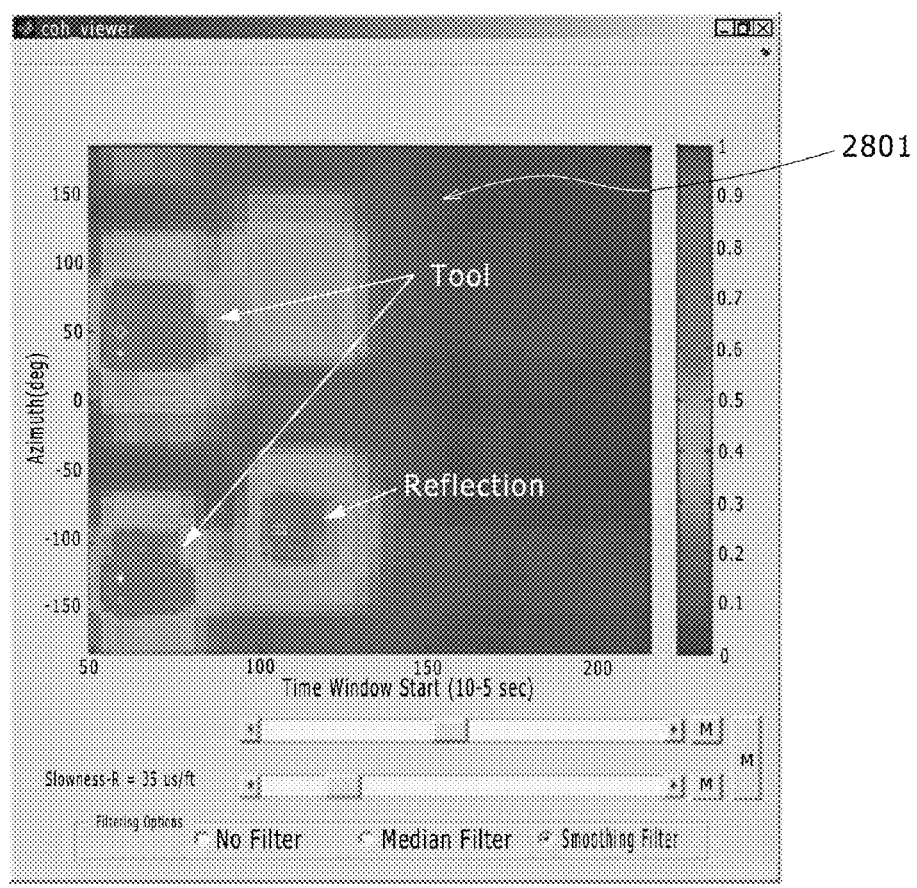

FIGS. 24, 25, and 26 represent 2D slices of the 3D slowness time coherence array for waveforms generated according to two, three, and six dipole source firings at different azimuths as depicted using a 2D viewer application.

Figure 27:
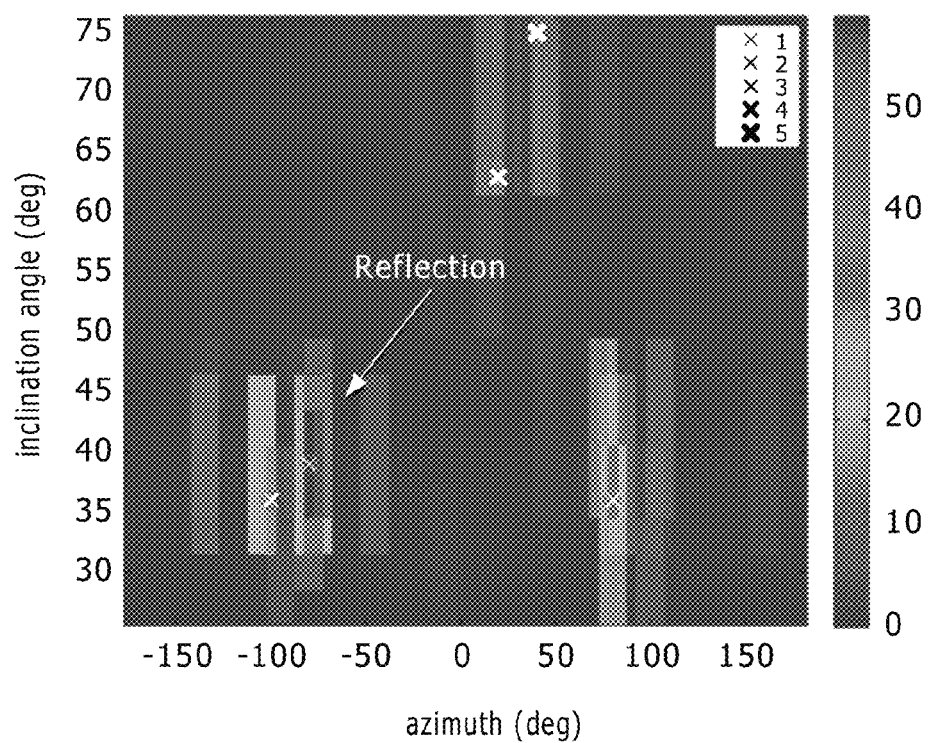

FIG. 27 represents a 2D scoring array indexed by inclination and azimuth angles used for automatically extracting parameter estimates from a 3D slowness time coherence representation of waveforms produced using dipole source firings and formation models depicted in FIG. 22.

Figure 28:
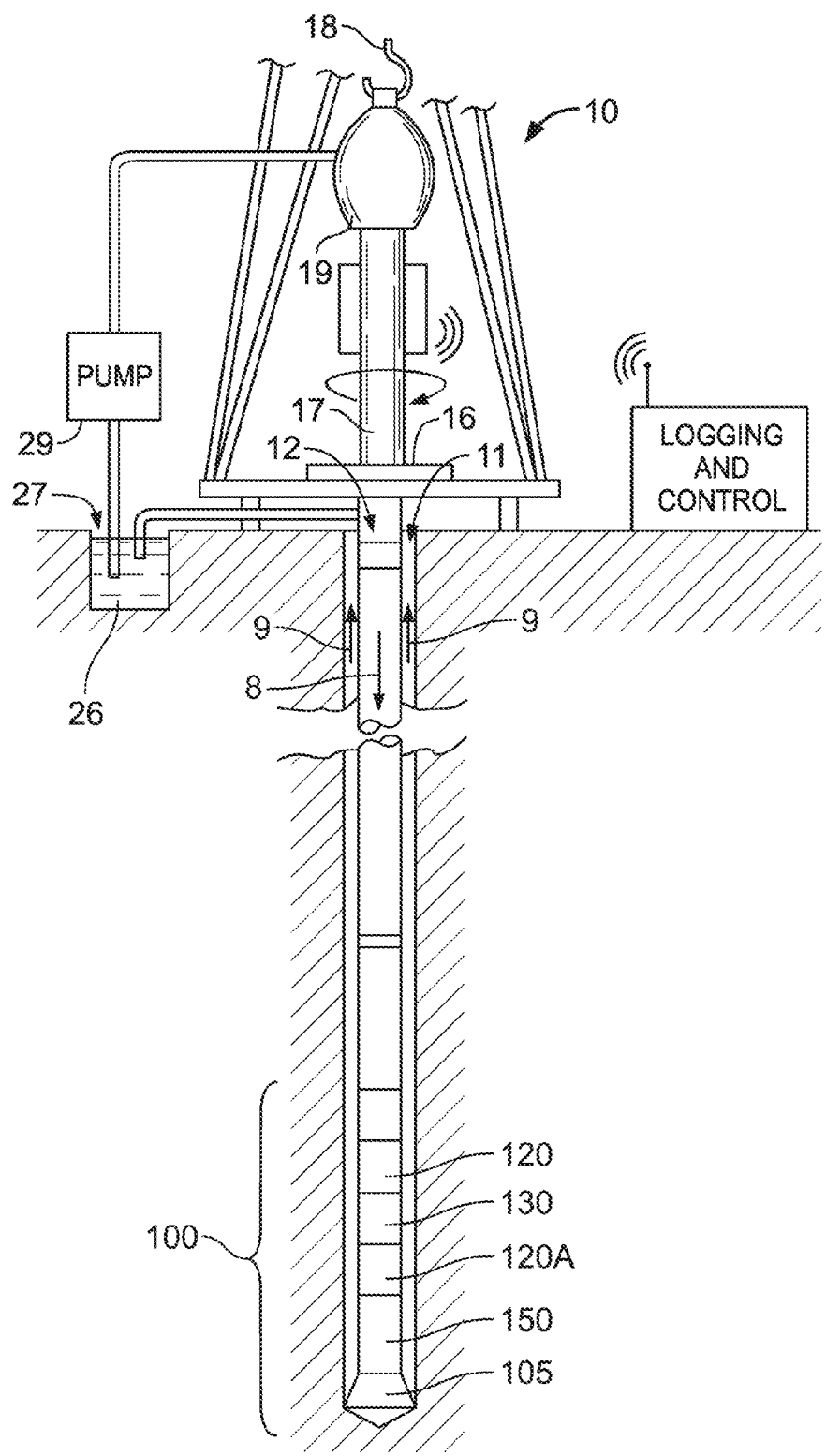

FIG. 28 illustrates an example system in which embodiments of the methods and apparatus methods and apparatus for determining slowness of wavefronts can be implemented.

Figure 29:
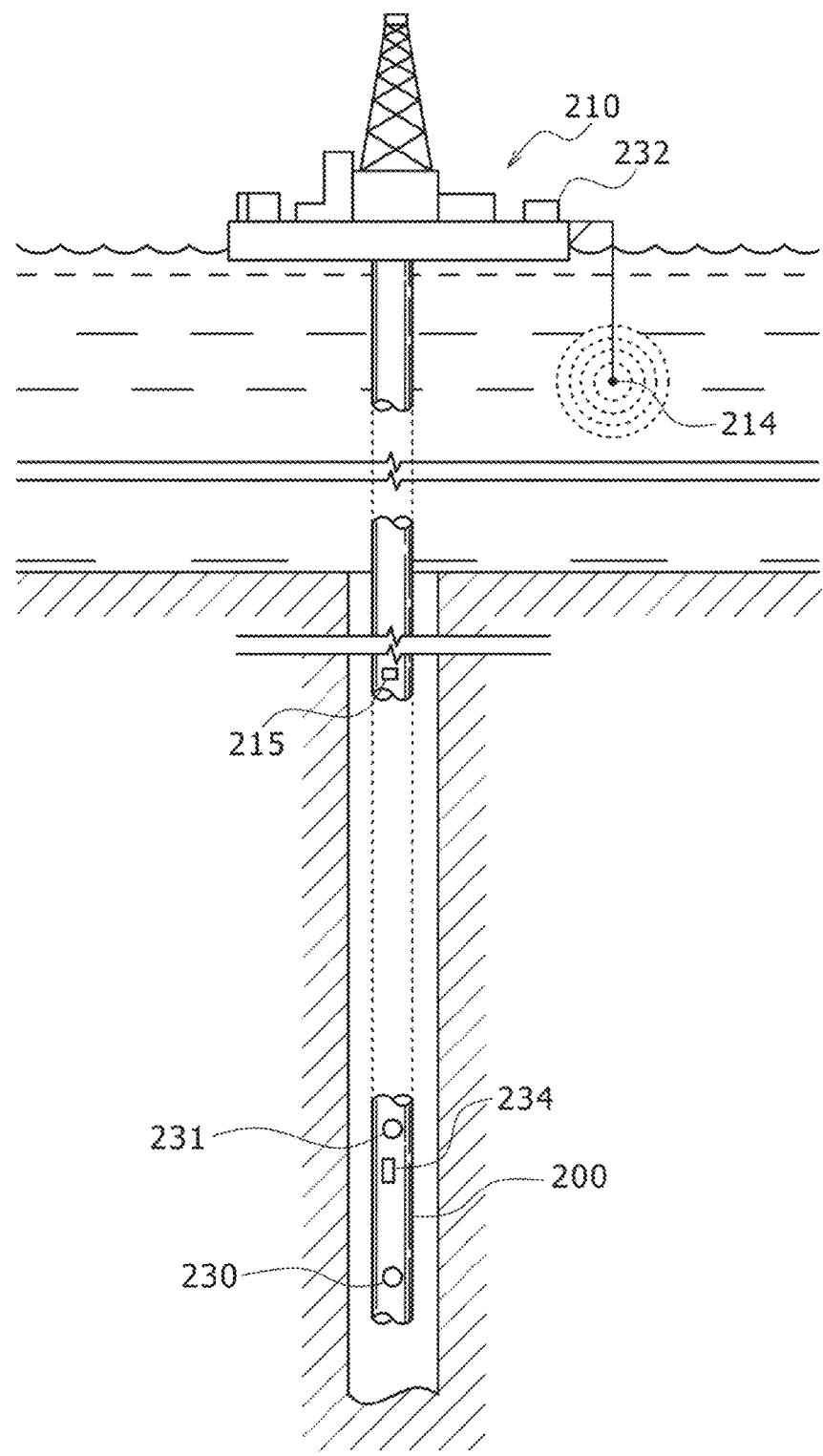

FIG. 29 illustrates another example system in which embodiments of the methods and apparatus for determining slowness of wavefronts can be implemented can be implemented.

Figure 30:
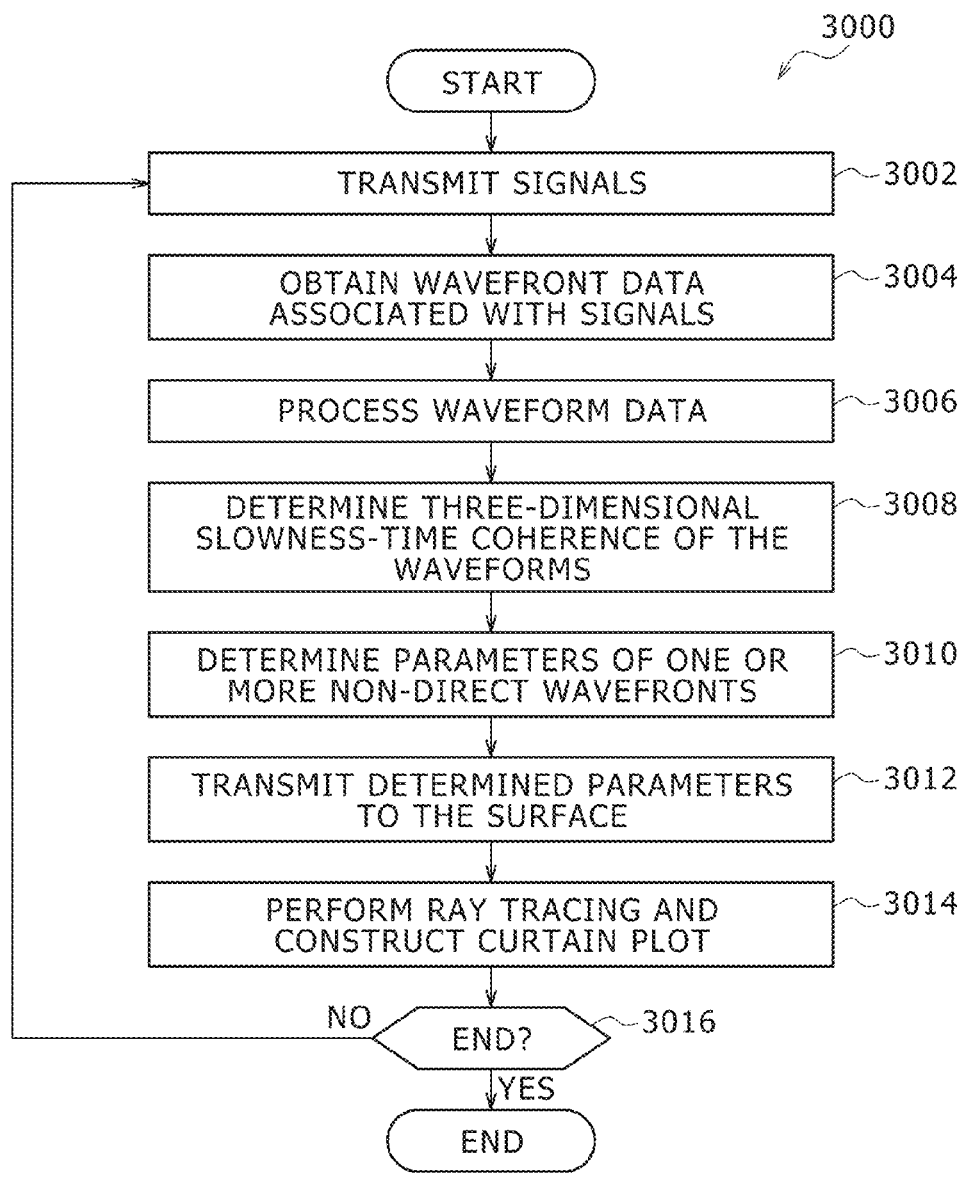

FIG. 30 depicts an example process that can be implemented using the example apparatus for methods and apparatus for determining slowness of wavefronts can be implemented.

Figure 31:
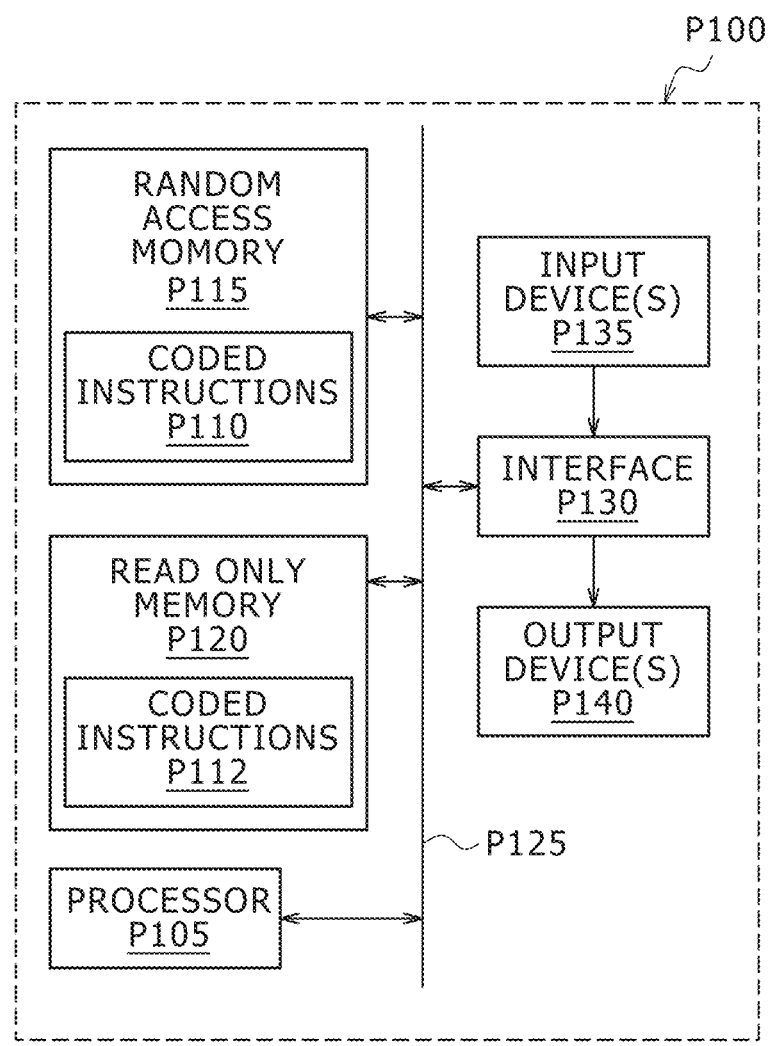

FIG. 31 is a schematic illustration of an example processor platform that may be used and/or programmed to implement any or all of the example methods and apparatus described herein.

DETAILED DESCRIPTION

In the following detailed description of the preferred embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

Changes in layer velocity may be used to determine a state (e.g., a liquid state, a gas state) of hydrocarbons contained in nearby Earth formation layers. Additionally or alternatively, changes in layer velocity may indicate the presence of a nearby high pressure zone that can represent a drilling hazard or the location of a fault or fracture. Identifying these Earth formation features can assist in determining optimal wellbore placement and in reservoir characterization when drilling exploration and/or production wells.

The examples disclosed herein relate to example methods and systems for processing and/or interpreting wavefront arrival events (e.g., direct and/or non-direct arrivals) and/or waveform measurements to determine arrival times and slowness propagation information for directions orthogonal to an axis of a tool sonde. The slowness propagation information may be used to determine directions of propagation of non-direct reflected and refracted arrivals in three spatial directions at an array of receivers. Obtaining information concerning propagation directions orthogonal to the axis of the tool sonde includes an observation concerning the variations in the arrival times at the receivers distributed around the circumference of the tool of a reflected wavefront as it propagates across a receiver array.

Figure 1:
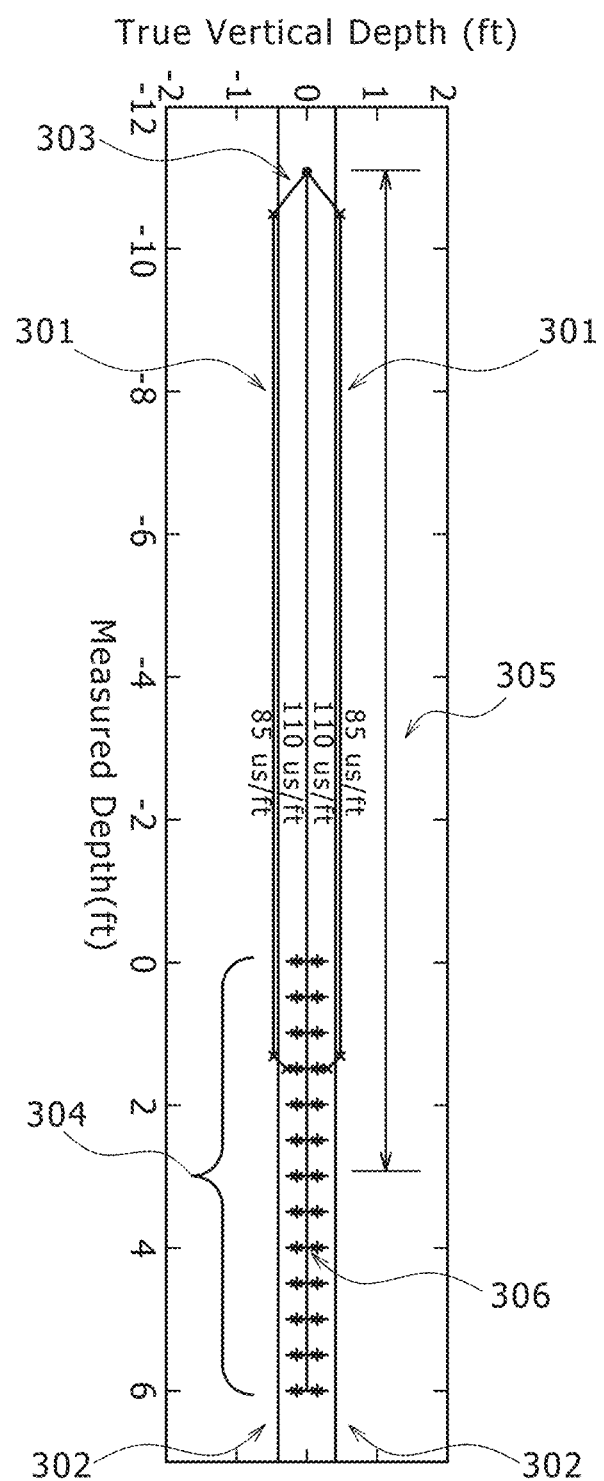
FIG. 1 is a ray tracing diagram depicting a borehole-guided wavefront.
Figure 2:
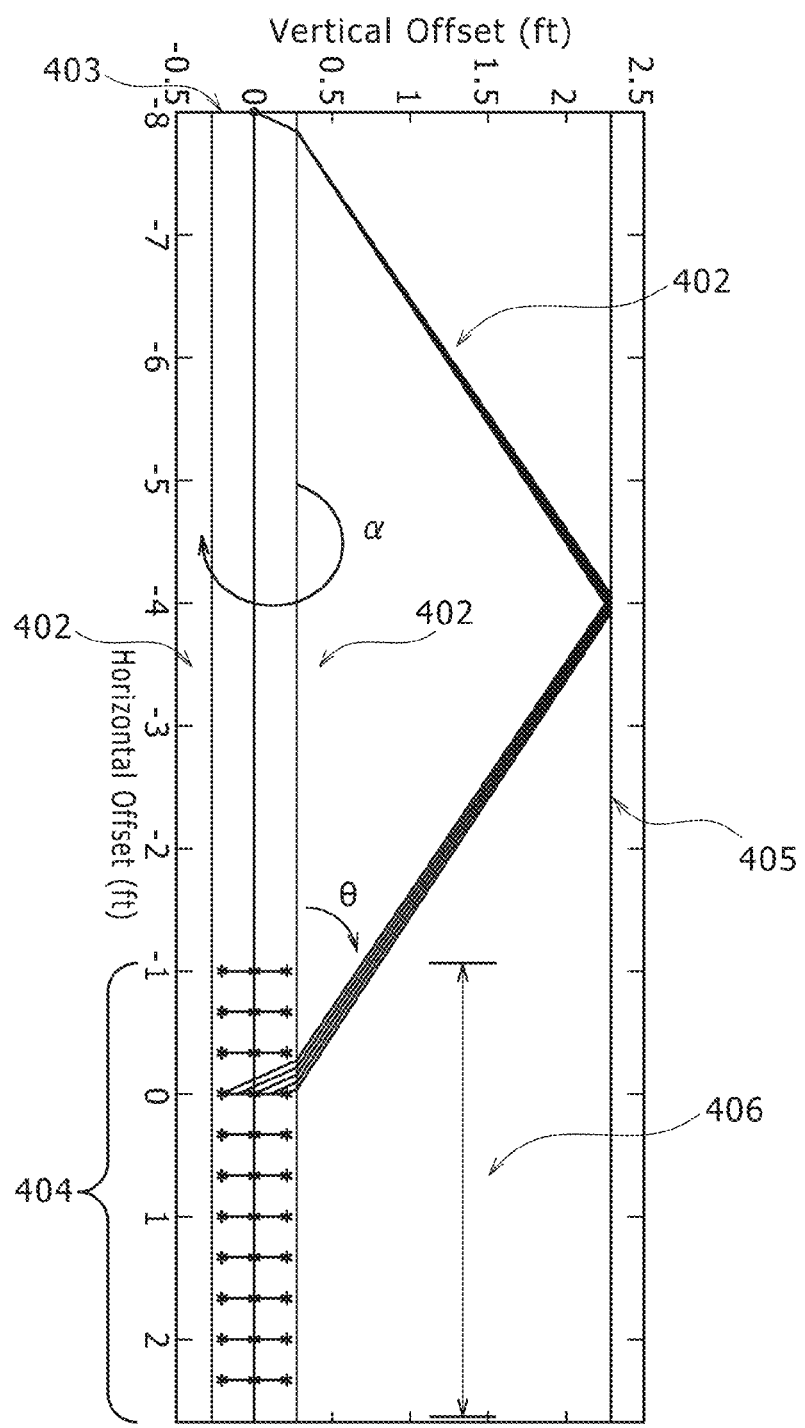
FIG. 2 is a ray tracing diagram depicting a wavefront reflecting off a nearby Earth formation layer boundary.
Figure 3:
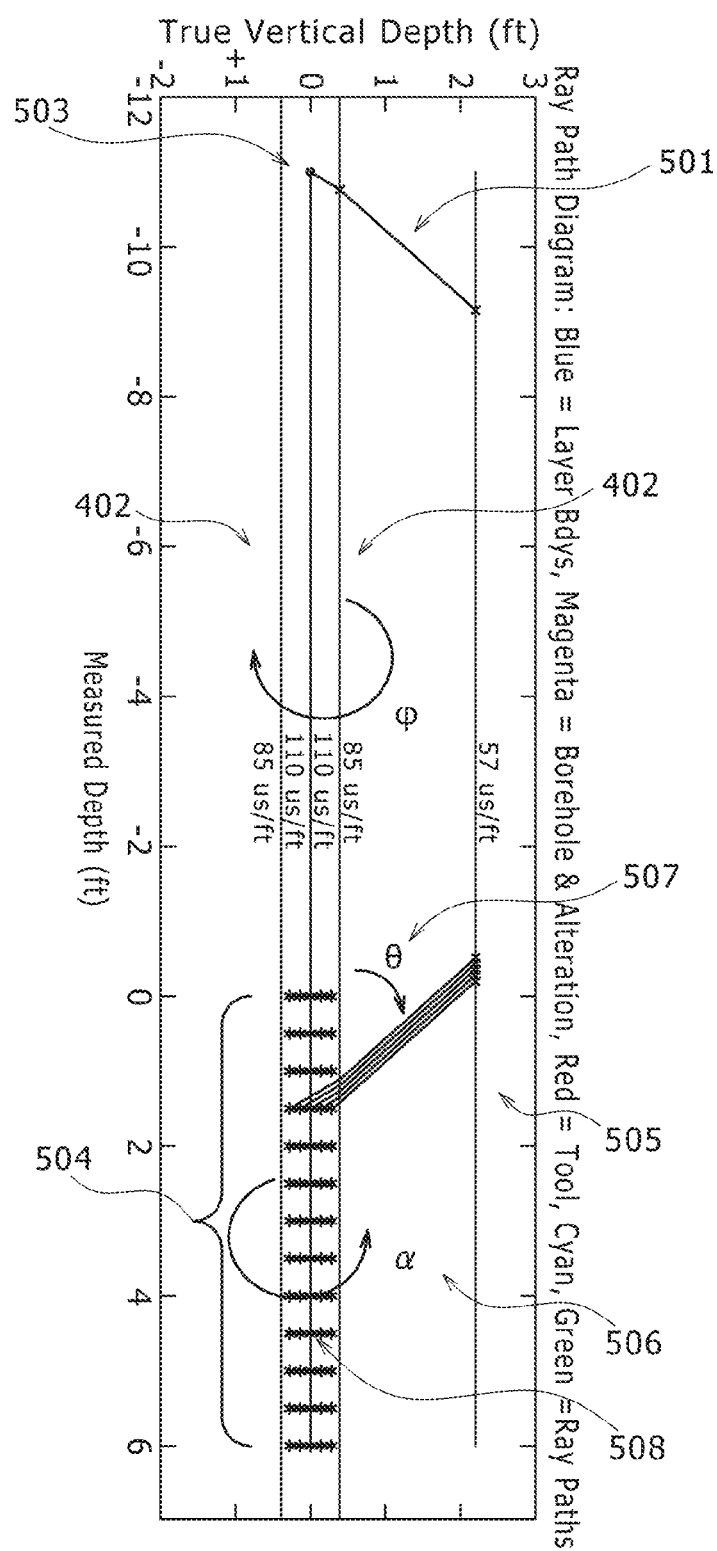
FIG. 3 is a ray tracing diagram depicting a wavefront refracting along a nearby Earth formation layer boundary.

Wavefronts, initially generated by a sonic source, probe numerous Earth formation features by propagating, reflecting, and refracting across the fluid/borehole interface as well as various faults, fractures, and formation layer boundaries. FIGS. 1, 2, and 3 depict example ray tracing diagrams that can be used to implement the examples disclosed herein.

FIG. 1 shows a ray tracing diagram depicting a propagation and/or ray path 301 of a direct or primary borehole-guided wavefront that refracts along a borehole/fluid interface 302 from an acoustic source 303 to an array of receiver sensors 304. Compressional and shear wavefronts are two examples of such borehole-borne wavefronts. Other examples of direct wavefronts include a wavefront that propagates through the fluid contained in the borehole (e.g., the Stoneley wave) and the wavefront that propagates through a tool sonde.

FIG. 2 is a ray tracing diagram depicts a propagation and/or ray path 401 of an indirect or non-direct wavefront emanating from an acoustic source 403 refracting across a borehole/fluid interface 402, reflecting off a nearby formation layer boundary 405 and arriving at an array of receivers 404.

FIG. 3 is ray tracing diagram depicting a propagation, ray path and/or refracted wavefront 501 of an indirect or non-direct wavefront emanating from an acoustic source 503 refracting across a borehole/fluid interface 502, refracting along a nearby formation layer boundary 505 and arriving at an array of receivers 504. Other non-direct sonic wavefronts include those associated with fractures and geologic faults.

When using a monopole source, in some examples, slownesses of the direct wavefronts recorded at one of the receiver arrays 304 may be determined using a one-dimensional slowness time coherence algorithm. $w_j(t)$ is the waveform associated with the $j^{th}$ of M source-receiver offsets (305 depicts the $7^{th}$ source-receiver offset). $E_c(\tau,s_z)$ in Equation 1 estimates coherent energy of any wavefront arrival event with arrival time $\tau$, duration $T_W$, and slowness $s_z$ measured along the axis of a tool 306, while $E_i(\tau,s_z)$ shown in Equation 2 measures the total energy of the wavefront arrival event. Equation 3 is the ratio of Equations 2 and 3 which is the coherence of the wavefront arrival event.

$$E_c(\tau, s_z) = \int_0^{T_W} \left[\sum_j w_j(t - \tau - s_z(z_j - z_1))\right]^2 dt \quad \text{Equation 1}$$

$$E_i(\tau, s_z) = \sum_j \int_0^{T_W} w_j^2(t - \tau - s_z(z_j - z_1)) dt \quad \text{Equation 2}$$

$$coh(\tau, s_z) = \sqrt{\frac{E_c(\tau, s_z)}{ME_i(\tau, s_z)}} \quad \text{Equation 3}$$

Differences in arrival times at the receivers distributed around the circumference of the tool can be modeled explicitly when the non-direct wavefront is the refracted wavefront 501 depicted in FIG. 3 and when, for purposes of modeling, the borehole 502 is treated as a thin fluid-filled Earth formation layer. Thus, the effects of diffraction around the borehole may be neglected. Equation 4 represents a time of arrival at the circular array of receivers 504 (also 704-708 of FIG. 5) around a circumference of a tool sonde, where $\alpha$ corresponds to a receiver azimuth 506, 712 (FIG. 5) of the receiver sensor around the circumference of the tool; $\alpha_0$ corresponds to the azimuth direction to the nearby formation layer boundary 505; $r_{borhole}$ corresponds to the radii of the borehole 502; $r_{tool}$ corresponds to the radii of a tool 508; $v_{fluid}$ corresponds to compressional wavespeed of the wellbore fluid; $\theta$ corresponds to an angle of incidence and/or inclination angle 507 of a wave at one or more of the circular arrays of receivers 504; and $T_o$ corresponds to a number independent of the receiver azimuth ($\alpha$) that depends on transmitter receiver spacing.

$$T_{Refraction}(\alpha) = T_0 + \frac{\cos\theta}{v_{fluid}}(r_{borhole} - r_{tool}\sin(\alpha - \alpha_0)) \quad \text{Equation 4}$$

When $v_{fluid}$=1500 meters per second, when the tool radius is 3 inches, and when the inclination angle 507 made by the refracted wavefront arrival event arriving at the receiver array 504 is 45 degrees, the total variation in the arrival times predicted by Equation 4 is approximately 70 microseconds. Thus, Equation 4 shows that the arrival times of the wavefronts received at the receivers 504 vary sinusoidally as a function of the receiver azimuth $\alpha$ 506 (e.g., have a sinusoidal moveout) and linearly as a function of receiver-source offset distance 305 (e.g., have a linear moveout).

To obtain slowness propagation information for directions orthogonal to the axis of a tool sonde, 3D slowness-time coherence algorithm can be constructed where slowness is represented in three spatial dimensions by a vector $s=(s_x,s_y,s_z)$ in 3-D Cartesian coordinates where z is the direction along an axis of the tool sonde 508. Further, the coordinates $x_{j,\alpha_k}$, represented by Equation 5 below, identify the 3-D spatial locations of the receiver sensors around the circumference of the tool sonde 508 having a radius, $r_{tool}$. The waveform data recorded at those sensors is represented by $w_{j,\alpha_k}(t)$.

$$x_{j,\alpha_k}=(r_{tool}\cos\alpha_k, r_{tool}\sin\alpha_k, z_j-z_1) \quad \text{Equation 5:}$$

$E_c(\tau,s)$ in Equation 6 estimates the coherent energy of any wavefront arrival event with arrival time $\tau$, duration $T_W$, and slowness s in 3-D Cartesian coordinates, while $E_i(\tau,s)$ shown in Equation 7 measures the total energy of the wavefront arrival event. Their ratio in shown in Equation 8 is the coherence of the arrival event. $\Omega$ represents the collection of receiver azimuth angles $\alpha_k$ where waveforms are received.

Equations 6, 7, and 8 can be computed for waveform data $w_{j,\alpha_k}(t)$ recorded using one or more firings of a monopole source.

$$E_c(\tau, s) = \int_0^{T_W} \left[\sum_{j,k} w_{j,\alpha_k}(t - \tau - s \cdot x_{j,\alpha_k})\right]^2 dt \quad \text{Equation 6}$$

$$E_i(\tau, s) = \sum_{j,k} \int_0^{T_W} w_{j,\alpha_k}^2(t - \tau - s \cdot x_{j,\alpha_k}) dt \quad \text{Equation 7}$$

$$coh(\tau, s) = \sqrt{\frac{E_c(\tau, s)}{M|\Omega|E_i(\tau, s)}} \quad \text{Equation 8}$$

The slowness s may be parameterized in Cartesian coordinates, cylindrical coordinates and/or spherical coordinates. Additionally, the examples may employ a subset of the 3D slowness-time coherence representation either for reasons of computational or memory capacity limitations or to incorporate prior knowledge of the location of various Earth formation features of interest, for example.

Equation 9 shows that the coherent energy estimator in Equation 6 stacks the waveform measurements $w_{j,\alpha_k}(t)$ with a sinusoidal moveout as a function of the receiver azimuth $\alpha_k$ 506 and with a linear moveout as a function of the source receiver offset $z_j-z_1$ 305.

$$s \cdot x_{j,\alpha_k} = (s_x \cos \alpha_k + s_y \sin \alpha_k) r_{tool} + s_z(z_j - z_1) \quad \text{Equation 9:}$$

The coherence estimator $coh(\tau,s)$ of Equation 8 may be used to detect and characterize both the refracted and reflected waves from nearby formation layer boundaries as well as the direct compressional, shear, and Stoneley arrivals.

Figure 4:
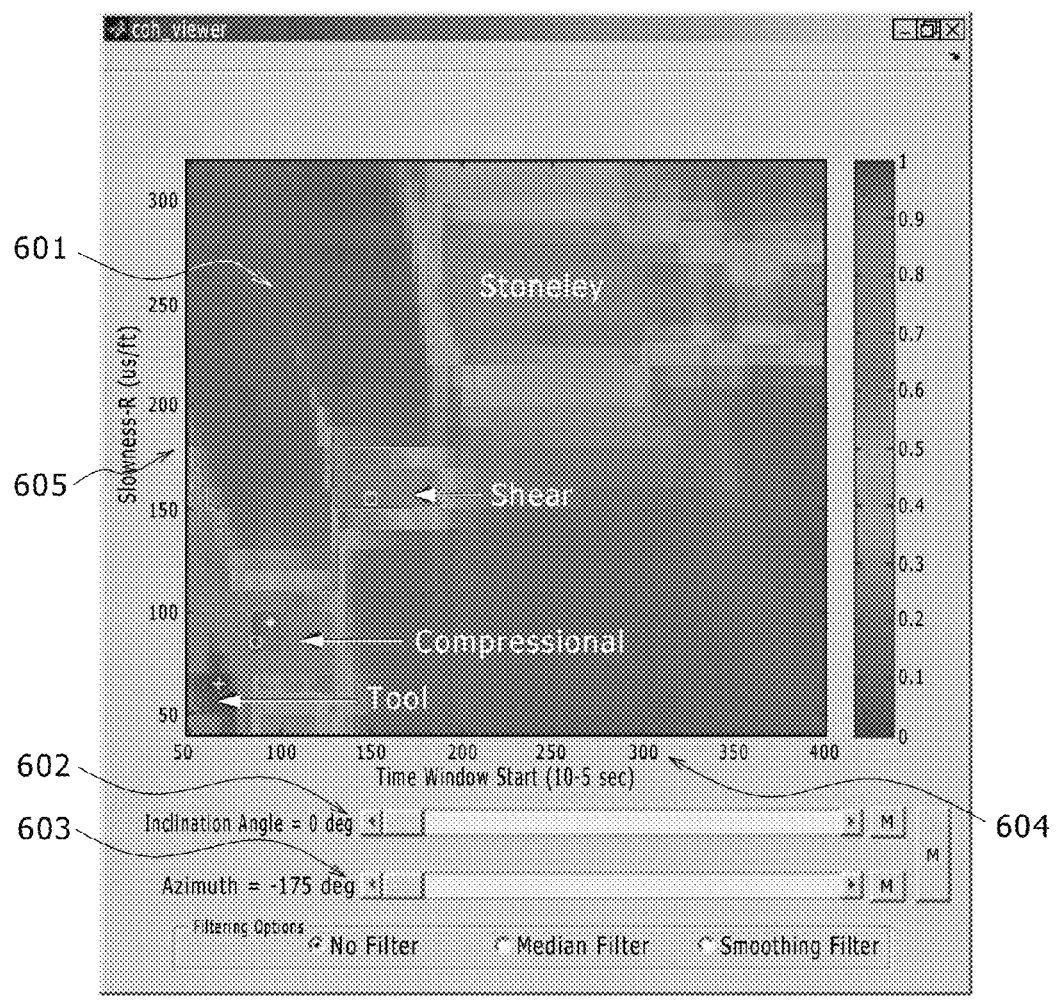
FIG. 4 depicts a one-dimensional slowness time coherence representation of several tool-borne and borehole-borne direct arrival wavefronts.

FIG. 4 shows a one-dimensional slowness time coherence representation including a viewer panel 601 produced by the processing described in Equations 1-3 for the waveform measurements including several direct arrival wavefronts received at the receiver arrays 304 (FIG. 1). An x-axis 604 corresponds to the wavefront arrival time, τ, while a y-axis 605 corresponds to the wavefront slowness, $s_z$ as measured along the axis of the tool 306. The most coherent arrival events are indicated with a high coherence value (e.g., adjacent the Stoneley, Shear, compressional arrival events and the tool). These arrival events include the direct primary compressional and shear arrivals, as well as the fluid arrival (Stoneley) and the tool-borne direct arrival. Estimates of the slownesses of the individual direct arrival wavefronts may be obtained by a peak finding algorithm. In this example, slider 603 corresponds to azimuth angle 509.

Figure 5:
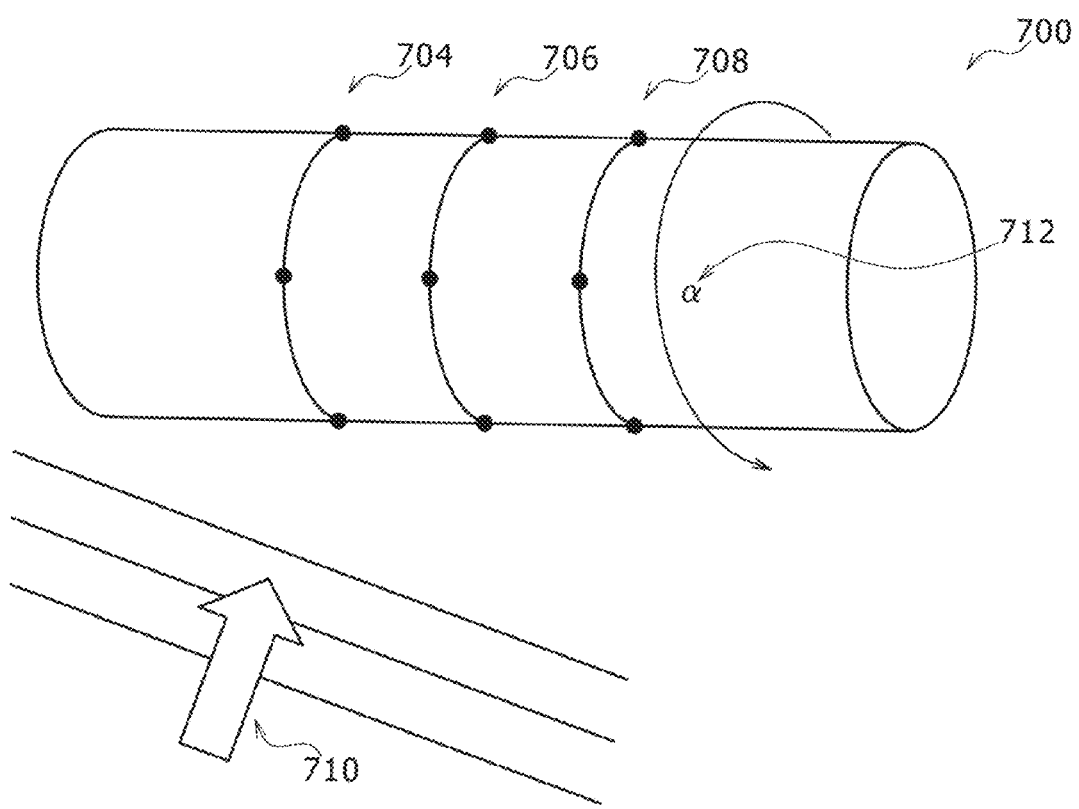
FIG. 5 illustrates an example system in which embodiments of the methods and apparatus for determining slowness of wavefronts can be implemented.

FIG. 5 depicts an example downhole tool and/or tool sonde 700 that may be used to implement the examples disclosed herein. The tool sonde 700 includes a plurality of receiver arrays 704-708, each having receivers distributed about a circumference of the tool sonde 700. A non-direct reflected or refracted wavefront 710 is depicted as approaching the receiver arrays 704-708. The wavefront 710 first arrives at receivers facing and/or closest to the formation boundary and later arrives at receivers facing away and/or farther from the formation boundary.

FIGS. 6, 7, 8, and 9 represent 2D slices of a coherence array $coh(\tau,s)$ of Equation 8 where 3D slowness s is given in cylindrical coordinates as defined in Equation 10. FIGS. 6-9 represent example uses of an example viewer application that may show the possible 2-D slices of a 4-dimensional coherence cube $coh(\tau,s)$.

$$s = (s_\rho, \varphi, s_z) = \left(\sqrt{s_x^2 + s_y^2}, \, a\tan\frac{s_y}{s_x}, s_z\right) \quad \text{Equation 10}$$

FIGS. 6, 7, and 8 represent example uses of a 2D viewer application to characterize compressional, shear, and Stoneley direct arrivals, respectively. The arrival events shown in 2D viewer panels 801, 901, and 1001 are described in terms of their propagation slowness along the tool axis, as indicated by an x-axes 804, 904, 1004 and in terms of their azimuthal resolution as indicated by a y-axes 805 905 1005. A 2D viewer slider bar settings 802, 902, and 1002 for radial slowness $s_\rho$ are zero, indicating that events propagating along the tool axis direction (the z-direction) will be shown in the viewer panels 801, 901, and 1001, respectively. The 2D viewer settings for arrival times τ shown made using a second slider bar 803, 903, and 1003 are 980, 2020, and 2620 in microseconds, indicating the arrival times of the displayed direct arrival events. The arrival events shown in 2D viewer panels 801, 901, and 1001 are vertical bands positioned at different $s_z$ slowness values indicating their coherence is essentially constant as a function of the azimuth angle φ 509. This vertical band is consistent with the fact that the propagation direction of these three direct arrival wavefronts is along the borehole wall or within the borehole fluid and parallel with the axis of the tool 508. Thus, each direct wavefront arrives simultaneously at the receivers with the fixed source-receiver offset 305.

FIG. 9 represents an example use of a 2D viewer application to characterize a reflected arrival. A first slider bar 1102 indicates that the radial slowness is $s_\rho$=130 microseconds per foot. This indicates that the propagation direction of the events shown in a viewer panel 1101 is not parallel to the tool 508 axis but rather crosses the tool axis. A second slider bar setting 1103 indicates that the arrival time (τ=1540 microseconds) of the reflected event arrives approximately between the arrival times of the compressional and shear arrivals as indicated by reference numbers 803 and 903. The localization of the arrival event along a vertical and/or y-axis axis 1105 of the viewer panel 1101 indicates that the 3D slowness-time coherence representation $coh(\tau,s)$ is able to characterize the azimuth angle φ 509 of the wavefront's propagation direction.

FIG. 4 described above also represents an example use of a 2D viewer application to characterize the compressional, shear, Stoneley, and tool-borne direct arrivals. In this example, the 3D slowness s in the 3D slowness time coherence representation $coh(\tau,s)$ has been parameterized in spherical coordinates as defined in Equation 11. The slider bar 602 indicates that the inclination angle θ 507 is zero degrees, so that events propagating along the tool 508 axis direction (the z-direction) will be shown in the viewer panels 601 and radial slowness displayed on the y-axis 605 is equal to slowness measured along the tool axis direction $s_r=s_z$. In this way, the 1D-slowness time coherence algorithm representation $coh(\tau,s_z)$ obtained using Equations 1, 2, and 3 is also a particular subset of the 3D-slowness time coherence representation obtained using Equations 6, 7, and 8.

$$s = (s_r, \theta, \varphi) = \left(\sqrt{s_x^2 + s_y^2 + s_z^2}, \, \frac{\pi}{2} - a\cos\frac{s_z}{s_r}, \, a\tan\frac{s_y}{s_x}\right) \quad \text{Equation 11}$$

In some examples, the precision with which the slowness orthogonal to an axis of the tool sonde 508, $s_x, s_y$ can be estimated or characterized. For example, for an acoustic source 503 whose bandwidth, B, is equal to 26 kHz, a radius of the tool, $r_{tool}$, is equal to 6 inches and a receiver aperture 406, A, is equal to 2 feet. The precision with which the arrival time τ of a wavefront received at a receiver array 504 may be obtained is given by $$\frac{1}{B} = 40 \text{ µs}.$$

The precision with which the slowness estimate $s_z$ along the tool 508 axis may be obtained is described by $$\frac{1}{AB} = 20 \frac{\text{µs}}{\text{ft}}.$$

The precision with which slownesses in directions orthogonal to the tool axis, $s_x$ and $s_y$, may be obtained is described by $$\frac{1}{2Br_{tool}} = 40 \frac{\text{µs}}{\text{ft}}.$$

The precision estimate depends inversely on the radius of the tool sonde $r_{tool}$ is indicative that the examples disclosed herein may be used in connection with larger diameter tool sondes that may be used in connection with logging-while-drilling operations.

In some examples, only the Fourier Transform of the recorded waveform measurements $w_{j,\alpha_k}(t)$, denoted by $\hat{w}_{j,\alpha_k}(\xi)$, may be available where ξ may represent frequency in Hertz. Equations 12, 13, and 14 describe a 3D slowness representation that may be used as an alternative to the 3D slowness time coherence representation described in Equations 6, 7, and 8.

$$E_c(s) = \int \left| \sum_{j,k} \exp(-2\pi i \xi (s \cdot x_{j,\alpha_k})) \hat{w}_{j,\alpha_k}(\xi) \right|^2 d\xi \qquad \text{Equation 12}$$

$$E_i(s) = \sum_{j,k} \int |\hat{w}_{j,\alpha_k}(\xi)|^2 d\xi \qquad \text{Equation 13}$$

$$coh(s) = \sqrt{\frac{E_c(s)}{M|\Omega|E_i(s)}} \qquad \text{Equation 14}$$

The coherent energy estimator $E_c(s)$ described in Equation 12 also stacks the waveform measurements $w_{j,\alpha_k}(t)$ with a sinusoidal moveout as a function of the receiver azimuth $\alpha_k$ 506 and with a linear moveout as a function of the source receiver offset $z_j - z_1$ 305, but, in this example, this operation is done in the Fourier domain.

For the example described in FIGS. 6, 7, 8, and 9, the reflected arrival is readily identifiable and not strongly interfered with by the compressional, shear, and Stoneley direct arrival events. Depending on the relative distance of the nearby formation layer boundary 505 to the acoustic tool 508, the direct arrivals can sometimes strongly interfere with the reflected arrival event. To enable the reflected arrivals to be more easily identified, direct arrivals may be removed from the waveform data using a wideband common source gather (CSG) filter represented by Equations 15 and 16. Equation 15 is used to determine a projection of the input waveforms $w_{j,\alpha_k}(t)$ according to moveout velocity, v, which is subtracted from the input waveforms to form a residual using Equation 16. In some examples, Equations 15 and 16 may be used for each of the Stoneley velocity, $v_{fluid}$, the compressional velocity, $v_c$, and the shear velocity, $v_s$, which may be obtained from acoustic logging results produced by projecting results of a 1-D slowness-time coherence algorithm described in Equations 1, 2, and 3 onto a slowness axis.

$$w_j^{projection}(t; v) = \frac{1}{M|\Omega|} \sum_{l,\alpha_k} w_{l,\alpha_k}^{input}\left(t + \frac{z_l - z_j}{v}\right) \qquad \text{Equation 15}$$

$$w_{j,\alpha_k}^{residual}(t; v) = w_{l,\alpha_k}^{input}(t) - w_j^{projection}(t; v) \qquad \text{Equation 16}$$

FIG. 10 depicts a formation 1200 having layer boundaries 1201, 1202 and FIGS. 11, 12, and 13 illustrate the results of using the CSG filtering technique described by Equations 15 and 16. In operation, waveforms are collected at a receiver array 1203 after firing a monopole source located at location 1204.

FIG. 13 shows a 2D slice of a coherence array coh(τ,s) where the slowness s is parameterized in spherical coordinates defined in Equation 11. The arrival events shown in a 2D viewer panel 1301 are described in terms of their inclination angle 507 as indicated by a viewer panel y-axis label 1305 and by their azimuth angle 509 as indicated by a x-axis label 1304. The radial slowness $s_r$ shown on a slider bar 1302 is set to 130 us/ft which is equal to the compressional wavespeed computed using the 1D slowness time coherence algorithm via Equations 1, 2, and 3. A slider bar 1303 is set to 150×10$^{-5}$ seconds, the approximate arrival time for both the reflections from the top boundary 1201 and bottom boundary 1202. The interference of the direct arrivals strongly obscures the reflected arrivals from the top and bottom boundaries, so no arrival events are evident in the 2D viewer display panel 1301.

FIG. 12 illustrates the results of first filtering the waveforms using Equations 15 and 16 for compressional, shear, and Stoneley velocities $v_c$=130 us/ft, $v_s$=240 us/ft, and $v_{fluid}$=320 us/ft and then computing the 3D slowness-time coherence algorithm representation described in Equations 6, 7, and 8 for slowness s in spherical coordinates. In this example, the 2D slice selected using slider controls 1402 and 1403 is the same as was selected in FIG. 11. Filtering the waveforms enables the reflections to be more apparent in a viewer panel 1401 such as, for example, reflections from the water sand boundary and/or bottom boundary 1202 below the tool at azimuth ϕ=−90° and a cap rock boundary and/or top boundary 1201 above the tool at azimuth ϕ=90°. In this example, the x-axis 1404 corresponds to azimuth angle.

FIG. 13 illustrates the use of three applications of the CSG filter described in Equations 15 and 16, once for the three direct arrival event velocities $v_c$=130 us/ft, $v_s$=240 us/ft, and $v_{fluid}$=320 us/ft, a second application for the velocities $v_c$=134 us/ft, $v_s$=244 us/ft, and $v_{fluid}$=324 us/ft, and a third time for the velocities $v_c$=126 us/ft, $v_s$=236 us/ft, and $v_{fluid}$=316 us/ft. This filtering procedure was followed by computation of the 3D slowness-time coherence algorithm representation described in Equations 6, 7, and 8 for slowness s in spherical coordinates. A 2D viewer panel 1501 shows the same 2D slice of the 3D STC array representation coh(τ,s) as was selected in FIGS. 11 and 12 using slider bars 1502 and 1503. The two reflected arrival events from the two nearby Earth formation layer boundaries 1201 and 1202 are quite apparent in the display and/or viewer panel 1501. In this example, the x-axis 1504 corresponds to azimuth angle and the y-axis 1505 corresponds to inclination angle.

In addition to the interference of the borehole-borne direct compressional, shear, and Stoneley arrivals, the tool-borne direct arrival can also cause significant interference effects and obscure the reflected arrival. A semblance modification technique may be used to remove the signature of the tool-borne direct arrival from the 3D slowness time coherence representation $coh(\tau,s)$ as follows. Because the coherent energy of the tool arrival may often be very low, an energy threshold value $E_t$ may be chosen and Equation 17 may be used to define $coh(\tau,s)$ instead of Equation 8. Note that when $\sqrt{E_c(\tau,s)} > E_t$, this definition of $coh(\tau,s)$ in Equation 17 is the same as the definition provided in Equation 8, however, when $2\sqrt{E_c(\tau,s)} < E_t$, $coh(\tau,s) = 0$. This method may allow for the reduction or removal of the tool-borne direct arrival event from the 3D slowness time coherence representation.

$$coh(\tau, s) = \sqrt{\frac{\max(0, \max(E_t, \sqrt{E_c(\tau,s)}) * (2\sqrt{E_c(\tau,s)} - \max(E_t, \sqrt{E_c(\tau,s)})))}{M|\Omega|E_i(\tau, s)}}$$

Equation 17

While using the 2D viewer application to examine the 3D slowness time coherence representation $coh(\tau,s)$ (obtained, for example, using Equation 8) of the recorded waveforms $w_{j,\alpha_k}(t)$ may be helpful to detect and characterize direct and non-direct wavefront arrival events, a more automated detection algorithm is helpful for some applications, particularly real-time logging-while-drilling operations. The parameters of the most coherent reflection (e.g., an arrival time $\tau$, an inclination angle $\theta$ 507, the azimuth angle $\phi$ 509 and/or slownesses s) may be determined by locating the global maximum of a suitably chosen subspace of the 3D slowness time coherence representation $coh(\tau,s)$ of the waveform measurements. For example, the slowness s may be parameterized in spherical coordinates using Equation 11 $s=(s_r,\theta,\phi)$. The radial slowness $s_r^*$ may be set to be equal to the compressional slowness obtained using a 1D slowness time coherence algorithm via Equations 1, 2, and 3. Reflected non-direct arrivals whose inclination angle $\theta$ 507 may be greater than 25 degrees may be searched for. The arrival event search may be restricted to those arrival times $\tau<175\times10^{-5}$ seconds, so the wavefronts arriving at the receiver array 504 before the direct Shear arrival are considered. This automated search may be accomplished using Equation 18.

$$(\tau^*, \theta^*, \varphi^*) = \mathrm{argmax}_{\substack{\theta>25 \\ \tau<175}} coh(\tau, s_r^*, \theta, \varphi)$$

Equation 18

FIGS. 14, 15, and 16 represent the results of using Equation 18 for waveforms recorded by the receiver array 1203 of the sonic measurement device shown in FIG. 10 where a tool and borehole 1205 occupy different depths relative to the top and bottom boundaries 1201, 1202. The waveforms were filtered using a CSG filtering algorithm described by Equations 15 and 16 and then a 3D slowness time coherence representation $coh(\tau,s)$ of the filtered waveforms was computed using Equations 6, 7, and 8 with slowness s parameterized in spherical coordinates. Vertical segments 1601 in FIG. 14 represent the arrival time values $\tau^*$ obtained using Equation 18, while the log values shown in FIGS. 15 and 16 represent the values of the azimuth angle 509 $\phi^*$ and inclination angle 507 $\theta^*$ obtained, respectively, using Equation 18. The determined parameters ($\tau^*, s_r^*, \theta^*, \phi^*$) along with any other information may be transmitted to the surface using mud pulse telemetry.

At the surface, a ray tracer can use the determined parameter values ($\tau^*, s_r^*, \theta^*, \phi^*$) that have been telemetered to the surface to determine an orientation of and distance to a nearby boundary. FIG. 17 shows the results of this ray tracing operation performed on the logs shown in FIGS. 14, 15, and 16. The arrival times $\tau^*$ shown in FIG. 14 at first get later and later and then become earlier and earlier, and the determined azimuth parameters $\phi^*$ are equal to −90 degrees and then abruptly change value to +90 degrees at location 1701. The ray tracer produces a curtain image shown in FIG. 17 of a well trajectory that at first is moving away from the formation layer boundary 1201 above the tool and then later approaching a formation layer boundary 1202 below the tool.

FIGS. 18 and 19 help illustrate the some differences between the wavefronts produced by a dipole source from those produced by a monopole source. FIGS. 18 and 19 show a schematic view of the monopole and dipole source looking down the axis of tool sondes 2001 and 2101. The monopole source produces a spherical wavefront 2002 that propagates away from the tool sonde as shown by the dashed arrows, while the dipole source produces non-spherical wavefronts 2102, 2103 that have different polarities (+ and − signs) and an orientation angle $\beta$.

When using a dipole or multi-pole source, $E_c(\tau,s)$ in Equation 19 estimates the coherent energy of any wavefront arrival event with arrival time $\tau$, duration $T_W$, and slowness $s=(s_x,s_y,s_z)$ in 3-D Cartesian coordinates. The sign term $\mathrm{sgn}(\cos(m(\phi_s-\beta)))$ was added because the polarity of the source (i.e. the different signs of the transmitted wavefronts 2102 and 2103) means that the sign or polarity of a non-direct reflected or refracted wavefront received at the receiver array 504 is a function of the source orientation angle $\beta$. For example, when using a dipole source, the polarity or sign of the wavefront reflected from a nearby boundary when the positive pole of the dipole source faces the nearby boundary is opposite the polarity or sign of the wavefront reflected from the same nearby boundary when the negative pole of the dipole source faces the nearby boundary. The sign term $\mathrm{sgn}(\cos(m(\phi_s-\beta)))$ enables the two reflected wavefronts to have a mutually constructive contribution in Equation 19. Here m is the number of poles in the multi-pole acoustic source (m=0 is monopole, m=1 is quadrupole, etc.), $\phi_s$ is the stacking azimuth defined in Equation 22, and $(\alpha,\beta)\in\Omega$ represents the pairs of receiver-source azimuths 506.

$$E_c(\tau, s) = \int_0^{T_W} \left[ \sum_{\substack{(\alpha,\beta)\in\Omega, \\ \text{offset } j}} \mathrm{sgn}(\cos(m(\varphi_s-\beta))) w_{j,\alpha,\beta}(t-\tau-s\cdot x_{j,\alpha}) \right]^2 dt$$

Equation 19

$$E_i(\tau, s) = \sum_{j,(\alpha,\beta)\in\Omega} \int_0^{T_W} w_{j,\alpha,\beta}^2(t-\tau-s\cdot x_{j,\alpha}) dt$$

Equation 20

$$coh(\tau, s) = \sqrt{\frac{E_c(\tau, s)}{M|\Omega|E_i(\tau, s)}} \qquad \text{Equation 21}$$

$$\varphi_s = \operatorname{atan}\frac{s_y}{s_x} \qquad \text{Equation 22}$$

Because the sign term $\operatorname{sgn}(\cos(m(\phi_s-\beta)))$ in Equation 19 has unit magnitude, $E_i(\tau,s)$ shown in Equation 20 is nearly identical to Equation 7 and measures the total energy of the wavefront arrival event. The coherence of the arrival event $coh(\tau,s)$ is estimated in Equation 21 and closely resembles Equation 8.

The slowness s in the 3D slowness-time coherence representation $coh(\tau,s)$ described in Equations 19, 20, and 21 may be parameterized in Cartesian coordinates, cylindrical coordinates (Equation 10) and/or spherical coordinates (Equation 11). Additionally, the examples may employ a subset of the 3D slowness-time coherence representation for reasons of computational or memory capacity limitations or to incorporate prior knowledge of the location of various Earth formation features of interest.

Using 3D slowness-time coherence representation described in Equations 19, 20, and 21 with a dipole or multi-pole source (1) the direct arrival events (compressional, shear, Stoneley, tool, etc.) have small coherence values and thus are largely incoherent; and (2) use of multiple dipole source azimuths β means that there is a strong destructive interference amongst the arrival events associated with formation and borehole features that are rotationally symmetric with respect to the tool sonde 508. These rotationally symmetric arrival events include the direct arrival events.

The opposing polarities of the two wavefronts 2102 and 2103 generated by the dipole source leads to very low coherence for the direct arrival events in their 3D slowness time coherence representation $coh(\tau,s)$. FIGS. 4 and 20 show the 1D slowness time coherence representation obtained using Equations 1, 2, and 3 when using a monopole and dipole source, respectively, for an acoustic tool eccentered in a borehole within the same Earth formation. The viewer panel 601 (FIG. 4) shows very coherent indications of the major direct arrival events (tool, compressional, shear, Stoneley, etc.) while viewer panel 2201 shows indications of the tool arrival and a non-direct reflection from a nearby formation layer boundary. The other arrival events are largely incoherent. In this example, slider 2202 corresponds to inclination angle, slider 2203 corresponds to azimuth angle, an x-axis 2204 corresponds to arrival time z and the y-axis 2205 corresponds to slowness measured along the axis of the tool 508.

The asymmetries in the wavefronts 2102 and 2103 generated by a dipole source for different source azimuth angles β causes there to be a strong destructive interference between the arrival events associated with formation and borehole features that are rotationally symmetric with respect to the tool sonde 508, including the direct arrival events. FIG. 21 illustrates a finite difference model for an eccentered tool sonde 2301 with a mud channel 2302 eccentered within a borehole 2303. Twelve acoustic receiver sensors 2305 are shown distributed around the circumference of the tool sonde. The orientation of the dipole source, β=30 degrees, is indicated by line segment 2306. Also, a formation layer boundary (not shown) is located below the tool at azimuth 509 ϕ=−90 at a distance of 3 feet from a borehole 2303. The tool eccentering distance and orientation of the tool sonde 2301 within the borehole 2303 is also depicted in FIG. 22 by the indexed point #2. Finite difference models similar to the one depicted in FIG. 21 may be generated for the other points indexed in FIG. 22. The orientation of the dipole source azimuths for the finite difference models indicated by the indexed points in FIG. 22 is equal to the 30 degrees times the index minus one.

FIG. 23 shows a 2D slice of a 3-D slowness time coherence representation $coh(\tau,s)$ computed using Equations 19, 20, and 21 for the waveforms generated using a dipole source and a finite difference simulation where the material properties of the simulation are depicted in FIG. 21. Here 3D slowness s is represented in spherical coordinates from Equation 11. 2D viewer slider bars 2502 and 2503 indicate that the inclination angle 507 is θ=33 degrees and radial slowness is $s_r$=85 us/ft. While a viewer panel 2501 shows that the tool arrival with its lack of azimuthal resolution is quite evident, the signature of the reflected arrival from the nearby formation layer boundary is not well determined. FIG. 24 shows the same 2D slice of the 3-D slowness time coherence representation $coh(\tau,s)$ for the waveforms generated using two dipole source firings at β=30 and β=60. 2D viewer panel 2601 indicates the presence of two very strong low coherence horizontal streaks whose width each covers about 30 degrees of azimuth angles 509 between ϕ=30 and ϕ=60 degrees. These two symmetry cancellations arise because of the asymmetries in the direct wavefields generated by the two dipole source firings at different source azimuths β=30 and β=60. There is a destructive interference that occurs when computing the coherent energy of these direct wavefront arrival events using Equation 19. FIG. 25 shows the same 2D slice of the 3-D slowness time coherence representation as displayed in FIG. 23 but for the waveforms generated using three dipole source firings at azimuths β=30, β=60, and β=90. The two symmetry cancellations represented by the two very strong low coherence horizontal streaks shown in a 2D viewer panel 2701 are each now nearly 60 degrees in width between ϕ=0 and ϕ=60 degrees. FIG. 26 shows the same 2D slice of the 3-D slowness time coherence representation as displayed in FIG. 23 but for waveforms generated by six dipole source firings between β=30 and β=180 degrees. In viewer panel 2801 of FIG. 26 there are two arrival events that remain—a tool arrival and a non-direct reflected arrival. The azimuth 509 of the reflected arrival is ϕ=−90 degrees and corresponds to the formation layer approximately three feet below the borehole/tool model described in FIG. 21. The azimuth of the tool arrival is ϕ=−130 degrees and approximately corresponds to tool eccentering positions 2401 depicted in FIG. 22.

The results of using of multiple dipole source azimuths as described in FIGS. 20-26 indicate that (1) the natural destructive interference between the direct arrival events means that use of the CSG filtering algorithm described by Equations 15 and 16 is not used when using multiple dipole source azimuths; (2) no prior knowledge of the azimuth of the formation layer boundary is used for the processing method. Useful information about the formation layer boundary non-direct reflected arrival event is to be obtained by processing the waveforms recorded from the dipole source azimuths, β.

The semblance modification methods presented in Equation 17 can be used instead of using Equation 21 as a means of removing the signature of the tool-borne direct arrival visible, for example, in 2801 from the 3D slowness time coherence representation $coh(\tau,s)$.

While using the 2D viewer application to examine the 3D slowness time coherence representation coh(τ,s) of recorded waveforms $w_{j,\alpha,\beta}(t)$ obtained using Equations 19, 20, and 21 or using Equations 19, 20, and 17 when employing a dipole or multi-pole source may be helpful to detect and characterize direct and non-direct wavefront arrival events, a more automated detection algorithm is helpful for some applications, particularly real-time logging-while-drilling operations. The parameters of the most coherent reflections (e.g. arrival times, the inclination 507 and the azimuth 509 angles, and/or slownesses s) may be determined by locating a suitable number of local maxima of a suitably chosen subspace of the 3D slowness time coherence representation coh(τ,s) of the waveform measurements. For example, to parameterize the slowness s=$(s_r,\theta,\phi)$ in spherical coordinates from Equation 11, the radial slowness $s_r^*$ may be set equal to the compressional slowness obtained via Equation 3 and the arrival event search may be restricted to those arrival times $\tau < 175 \times 10^{-5}$ seconds. A first estimate of a number (e.g. 5) of local maxima of the various arrival time τ-slices of coh($\tau_i, s_r^*, \theta_{ij}, \phi_{ij}$) for each value of $\tau_i$ may be estimated. Once obtained, the local maxima may be ordered in order of increasing coherence for each value of $\tau_i$ so that coh($\tau_i, s_r^*, \theta_{ij}, \phi_{ij}$)≤coh($\tau_i, s_r^*, \theta_{ij+1}, \phi_{ij+i}$). Then a 2-D scoring array may be constructed using Equation 23. FIG. 27 shows the results of constructing this 2-D scoring array for the waveforms recorded for dipole source firings depicted in FIG. 22. A mean arrival time for each of a number (e.g. 5) of the local maxima of the 2-D scoring array G(θ,φ) may be determined so that the inclination and azimuth angle parameters of the local maxima of the 2-D scoring array G(θ,φ) along with their mean arrival times may be transmitted to the surface using a mud pulse telemetry. At surface, the telemetered parameters may be used in performing a ray tracing to determine an orientation and distance to a nearby boundary.

$$G(\theta, \varphi) = \sum_{\substack{\theta = \theta_{ij} \\ \varphi = \varphi_{ij}}} j \qquad \text{Equation 23}$$

FIG. 28 illustrates a wellsite system in which the examples disclosed herein can be employed. The wellsite can be onshore or offshore. In this example system, a borehole 11 is formed in subsurface formations by rotary drilling. However, the examples described herein can also use directional drilling, as will be described hereinafter.

A drill string 12 is suspended within the borehole 11 and has a bottom hole assembly 100 that includes a drill bit 105 at its lower end. The surface system includes a platform and derrick assembly 10 positioned over the borehole 11. The assembly 10 includes a rotary table 16, a kelly 17, a hook 18 and a rotary swivel 19. The drill string 12 is rotated by the rotary table 16. The rotatory table 16 may be energized by a device or system not shown. The rotary table 16 may engage the kelly 17 at the upper end of the drill string 12. The drill string 12 is suspended from the hook 18, which is attached to a traveling block (also not shown). Additionally, the drill string 12 is positioned through the kelly 17 and the rotary swivel 19, which permits rotation of the drill string 12 relative to the hook 18. Additionally or alternatively, a top drive system may be used to impart rotation to the drill string 12.

In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9. In this manner, the drilling fluid 26 lubricates the drill bit 105 and carries formation cuttings up to the surface as it is returned to the pit 27 for recirculation.

The bottom hole assembly 100 of the example illustrated in FIG. 28 includes a logging-while-drilling (LWD) module 120, a measuring-while-drilling (MWD) module 130, a roto-steerable system and motor 150, and the drill bit 105.

The LWD module 120 may be housed in a special type of drill collar and can contain one or more logging tools. In some examples, the bottom hole assembly 100 may include additional LWD and/or MWD modules. As such, references throughout this description to reference numeral 120 may additionally or alternatively include 120A. The LWD module 120 may include capabilities for measuring, processing, and storing information, as well as for communicating with the surface equipment. Additionally or alternatively, the LWD module 120 includes a sonic measuring device.

The MWD module 130 may also be housed in a drill collar and can contain one or more devices for measuring characteristics of the drill string 12 and/or the drill bit 105. The MWD tool 130 further may include an apparatus (not shown) for generating electrical power for at least portions of the bottom hole assembly 100. The apparatus for generating electrical power may include a mud turbine generator powered by the flow of the drilling fluid. However, other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device and/or an inclination measuring device.

Although the components of FIG. 28 are shown and described as being implemented in a particular conveyance type, the examples disclosed herein are not limited to a particular conveyance type but, instead, may be implemented in connection with different conveyance types including, for example, coiled tubing, wireline wired drillpipe and/or any other conveyance types known in the industry.

FIG. 29 illustrates a sonic logging-while-drilling tool that can be used to implement the LWD tool 120 or may be a part of an LWD tool suite 120A of the type described in U.S. Pat. No. 6,308,137, which is hereby incorporated herein by reference in its entirety. An offshore rig 210 having a sonic transmitting source or array 214 may be deployed near the surface of the water. Additionally or alternatively, any other type of uphole or downhole source or transmitter may be provided to transmit sonic signals. In some examples, an uphole processor controls the firing of the transmitter 214.

Uphole equipment can also include acoustic receivers (not shown) and a recorder (not shown) for capturing reference signals near the source of the signals (e.g., the transmitter 204). The uphole equipment may also include telemetry equipment (not shown) for receiving MWD signals from the downhole equipment. The telemetry equipment and the recorder may be coupled to a processor (not shown) so that recordings may be synchronized using uphole and downhole clocks. The downhole LWD module 200 includes at least acoustic receivers 230 and 231, which are coupled to a signal processor so that recordings may be made of signals detected by the receivers in synchronization with the firing of the signal source.

The uphole source 214 or a downhole source 215 may be a monopole, dipole, or multi-pole source. The waveform data associated with the signals is detected by the receivers 230 and 231. Using one or more processors 232 and/or 234, the waveform data may then be filtered using the CSG filtering procedure described in Equations 15 and 16 to remove the direct wavefront arrival events from the waveform measurements. The CSG filtering procedure may be carried out for one or more of the compressional, shear, and Stoneley velocities as well as for the velocities plus or minus 4 microseconds per foot, for example. The compressional, shear, and Stoneley velocities used for the CSG filtering procedure may be computed using the 1D-slowness time coherence algorithm described in Equations 1, 2, and 3.

One or more processors 232 and/or 234 may then process the waveform data to determine a 3D slowness time coherence representation $coh(\tau,s)$ of the waveforms. The processors may process the waveform data in substantially real time while drilling the formation. When using a monopole source, the 3D slowness time coherence representation may be determined using Equations 6, 7, and 8 or using Equations 6, 7, and 17 if a semblance modification is desired to remove the tool-borne direct arrival. When using a dipole or multi-pole source, the 3D slowness time coherence representation $coh(\tau,s)$ may be determined using Equations 19, 20, and 21 or using Equations 19, 20, and 17 if a semblance modification is desired to remove the tool-borne direct arrival. The 3D slowness s may be represented in Cartesian, cylindrical, and/or spherical coordinates. Further, a subset of the 3D slowness time coherence representation may be computed in order to incorporate prior knowledge of the Earth formation or drilling operation or to manage the computing and/or memory requirements of the available computing hardware.

To identify the non-direct wavefront arrivals, the one or more processors 232 and/or 234 may identify local maxima of the 3D slowness time coherence representation $coh(\tau,s)$ of the waveform data. When using a monopole source, this may be accomplished, for example, using Equation 18. When using a dipole or multi-pole source, this may be accomplished by identifying the local maxima of the 2D scoring array constructed in Equation 23. The parameters of these local maxima that describe any detected non-direct reflected wavefront arrivals may include approximate arrival times and slownesses given in Cartesian coordinates, cylindrical coordinates, or spherical coordinates. These determined parameters may then be transmitted to the surface using, for example, a mud pulse telemetry system or other conveyance method where they may be used in performing a ray tracing to determine an orientation and distance to a nearby boundary.

FIG. 30 depicts an example flow diagram representative of a process that may be implemented using, for example, computer readable and executable instructions that may be used to determine the slowness of wavefronts associated with an Earth formation feature. The example operations of FIG. 30 may be performed using a processor, a controller and/or any other suitable processing device. For example, the example operations of FIG. 30 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example operations of FIG. 30 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example operations of FIG. 30 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the example operations of FIG. 30 may be implemented manually or as any combination(s) of any of the foregoing techniques, for example, any combination of firmware, software, discrete logic and/or hardware. Further, although the example operations of FIG. 30 are described with reference to the flow diagram of FIG. 30, other methods of implementing the operations of FIG. 30 may be employed. For example, the order of execution of the blocks may be changed, and/or some of the blocks described may be changed, eliminated, sub-divided, or combined. Additionally, any or all of the example operations of FIG. 30 may be performed sequentially and/or in parallel by, for example, separate processing threads, processors, devices, discrete logic, circuits, etc.

The example process 3000 of FIG. 30 may begin by transmitting signals (e.g., acoustic or sonic signals) from one or more transmitters and/or sources (block 3002). In some examples, the source may be one or more monopole sources and/or one or more dipole sources and/or one or more multi-pole sources.

Thereafter, at least a portion of the signals transmitted by the acoustic source are received at one or more receiver sensors at least one azimuth location around the circumference of the tool sonde and spaced from the transmitters. The received signals may be recorded and/or logged to generate waveform data associated with the signals (block 3004).

The example process 3000 may then process the received waveforms by, for example, using the CSG filtering procedure described in Equations 15 and 16 to remove the direct wavefront arrival events from the waveform measurements (block 3006). The filtering procedure may be used when using a monopole acoustic source. The CSG filtering procedure may be carried out for one or more of the compressional, shear, and Stoneley velocities as well as for the velocities plus or minus 4 microseconds per foot. The compressional, shear, and Stoneley velocities for the CSG filtering procedure may be computed using the 1D-slowness time coherence algorithm described in Equations 1, 2, and 3.

One or more processors may process the waveform data to determine a 3D slowness time coherence representation of the waveforms (block 3008). The processors may process the waveform data in substantially real time while drilling the formation. When using a monopole source, the 3D slowness time coherence representation $coh(\tau,s)$ may be determined using Equations 6, 7, and 8 or using Equations 6, 7, and 17 if a semblance modification is desired to remove the tool-borne direct arrival. When using a dipole or multi-pole source, the 3D slowness time coherence representation coh(τ,s) may be determined using Equations 19, 20, and 21 or using Equations 19, 20, and 17 if a semblance modification is desired to remove the tool-borne direct arrival. The 3D slowness s may be represented in Cartesian, cylindrical, and/or spherical coordinates. Further, a subset of the 3D slowness time coherence representation may be computed in order to incorporate prior knowledge of the Earth formation or drilling operation or to manage the computing and/or memory requirements of the available computing hardware.

To identify the non-direct wavefront arrivals, the one or more processors may identify local maxima of the 3D slowness time coherence representation coh(τ,s) of the waveform data (block 3010). When using a monopole source, this may be accomplished, for example, using Equation 18. When using a dipole or multi-pole source, this may be accomplished by identifying the local maxima of the 2D scoring array constructed in Equation 23. The parameters of these local maxima that describe any detected non-direct reflected or refracted wavefront arrivals may include approximate arrival times and slownesses given in Cartesian coordinates, cylindrical coordinates, or spherical coordinates. These parameters may then be transmitted to the surface using, for example, a mud pulse telemetry system (block 3012).

At the surface, these telemetered parameters describing any non-direct reflected wavefront arrivals may then be used with a ray tracing algorithm to determine an orientation to and distance to one or more Earth formation features relative to the downhole tool (block 3014). These features may include Earth formation layer boundaries, fractures, or geologic faults. In some examples, to assist in geosteering decisions, a curtain plot may be produced using at least some of the information obtained. The curtain plot depicts nearby Earth formation layers, fractures, or geologic faults relative to the well trajectory. Additionally or alternatively, constraints of real-time acoustics measurements may be combined with similar information derived from electromagnetic measurements to assist in geosteering decisions.

In some examples, the telemetered arrival times, slownesses and/or other information may be also displayed in a log plot as shown, for example, in FIGS. 14-16. At block 3016, the example process 3000 determines whether or not to end.

FIG. 31 is a schematic diagram of an example processor platform P100 that may be used and/or programmed to implement to implement a logging and control computer and/or any of the examples described herein. For example, the processor platform P100 can be implemented by one or more general purpose processors, processor cores, microcontrollers, etc.

The processor platform P100 of the example of FIG. 31 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

The input device P135 may, for example, provide waveform data associated with the signals detected by acoustic receiver sensors 504. The processor platform P100 may process said waveform data to produce a 3D slowness-time coherence representation coh(τ,s) of the waveform data, slowness s being represented in Cartesian, cylindrical, or spherical coordinates. The output devices P140 may display various 2D slices of the 3D slowness time coherence representation using an example 2D viewer application, as shown for example by FIGS. 6-9.

The examples disclosed herein provide methods to detect direct or non-direct reflected or refracted wavefronts at an array of receivers and to determine their approximate arrival times and slownesses in three spatial directions. In operation, compressional, shear and Stoneley waves arrive initially at receivers closest to a source (e.g., monopole, dipole, quadrupole and/or multi-pole) and later at more distant receivers. Non-direct reflected and/or refracted waves may reflect or refract from a formation boundary and propagate across a receiver array. These reflected and/or refracted waves first arrive at receivers facing the formation boundary and later arrive at receivers facing away from the formation boundary. Thus, the arrival times of the wavefronts at the receivers vary linearly as a function of receiver-source distance (e.g., linear moveout) and sinusoidally as a function of receiver azimuth (e.g., sinusoidal moveout). To enable the determination of arrival times, inclination angles, azimuth angles and/or slownesses, the received waveforms may be stacked with respect to linear moveout and sinusoidal moveout.

The examples disclosed herein relate to the detection and imaging of formation layer velocity changes using sonic waveform measurements. More specifically, the examples disclosed herein relate to example methods and systems for processing and/or interpreting arrival events (e.g., direct, reflected and/or refracted arrivals) and/or waveform measurements to determine arrival times and slowness propagation information for directions orthogonal to an axis of a tool sonde. The slowness propagation information may be used to determine directions of propagation of reflected and refracted arrivals in three spatial directions at an array of receivers. Additionally, the slowness propagation information may be used to determine an orientation of and distance to nearby formation layer interfaces associated with the arrivals (e.g., reflected arrivals).

The example methods and apparatus disclosed herein may be used to produce a three-dimensional (3-D) slowness-time coherence array representation of sonic waveform measurements obtained using one or more monopole sources, dipole sources and/or multi-pole sources. The slowness may be parameterized in Cartesian coordinates, cylindrical coordinates and/or spherical coordinates. Arrival times, inclination angles, azimuth angles and/or slownesses associated with the direct and non-direct wavefront arrivals may be determined from the one or more local maxima identified within the 3-D slowness time coherence array representation.

When using a monopole source, reflections may be obscured because reflections can arrive at receivers at substantially the same time as the larger amplitude primary direct arrivals (e.g., compressional, shear and/or Stoneley). To enable the reflections to be more readily identifiable, the examples disclosed herein may filter the waveforms using a time domain median filtering algorithm in the common source gather (CSG) domain. For each of the Stoneley, compressional and shear velocities, the filtering algorithm may compute a projection of an input waveform according to a moveout velocity that is subtracted from the input waveforms to form a residual. A wideband filter may be used that computes a projection of an input waveform according to a moveout velocity for each velocity and plus and minus of that velocity (e.g., +/−4 microseconds per foot) that is subtracted from the input waveforms to form a residual. Such an approach significantly reduces the presence of primary direct arrivals while leaving the reflections substantially intact.

Non-direct reflected and refracted wavefront arrival events may be obscured because of the interference of the direct tool arrival event. To remove a signature of a tool borne direct arrival from the three-dimensional (3-D) slowness-time coherence representation of received sonic waveform measurements, a semblance modification technique may be applied.

A subset of the three-dimensional (3-D) slowness-time coherence representation of sonic waveform measurements may be obtained when parameterizing slowness using spherical coordinates by setting or fixing the radial slowness to be equal to the slowness of the direct compressional arrival (determined using the slowness-time coherence log), and/or restricting an inclination angle to be greater than 25 degrees, and/or considering arrival times less than $175 \times 10^{-5}$ seconds. A subset of the three-dimensional (3-D) slowness-time coherence representation may be computed in order to incorporate prior knowledge of the Earth formation or drilling operation and/or to manage the computing and/or memory requirements of the available computing hardware.

The three-dimensional (3-D) slowness-time coherence representation of sonic waveform measurements collected at a single measurement station may be used to determine the arrival time, inclination and azimuth angles of the most coherent reflection. Determined parameters relating to the one or more identified reflections may be transmitted uphole using mud pulse telemetry. A ray tracing may be performed at the surface using at least some of the information transmitted uphole to determine an orientation and distance to a nearby boundary. The ray tracing results for several measurement stations may be collected together to produce a curtain plot display that may depict nearby Earth formation layers, fractures, or geologic faults relative to the well trajectory.

In some examples, a 3-D slowness time coherence algorithm can be used to process waveforms received from multiple firings of a dipole source at different source azimuths. A 3-D slowness time coherence representation of the received waveform measurements may measure coherence of arrival events associated with formation and borehole features that are not rotationally symmetric relative to the tool sonde (i.e., not direct arrivals). By processing waveforms received from multiple source azimuths, waveform measurements associated with dipole source azimuths oriented with respect to the formation layer boundary may be processed and no special provisions may be used to locate the nearby formation layer boundary.

To identify parameters associated with a reflection when using dipole or multi-pole sources, local maxima of the 3-D slowness-time array representation of the received waveform measurements may be obtained for each fixed arrival time value. In some such examples, slowness may be represented in spherical coordinates. In some examples, a position of a point in spherical coordinates is specified by a radial distance from the point to a fixed origin, a polar angle measured from a fixed zenith direction and an azimuth angle of an orthogonal projection on a reference plane that passes through the origin and is orthogonal to the zenith, measured from a fixed reference direction on the reference plane. When performing such processing, the radial slowness may be set to be equal to slowness of the compressional slowness of direct arrivals that may be determined from monopole waveform measurements using a slowness-time coherence algorithm.

A two-dimensional (2-D) scoring array indexed by azimuth and inclination angle may then be constructed that accounts for each of the local maxima identified for each corresponding arrival time. Local maxima of this two-dimensional scoring array with the corresponding set of arrival times may determine parameters that may include one or more arrival times, inclination angles, azimuth angles and/or slownesses describing non-direct refracted or reflected wavefront arrival events. Slownesses may be represented in Cartesian coordinates, cylindrical coordinates, and or spherical coordinates. The determined parameters may be transmitted uphole using mud pulse telemetry. A ray tracing may be performed at the surface using at least some of the information transmitted uphole to determine an orientation and distance to a nearby boundary.

An example method includes transmitting signals from a plurality of sources, the sources spaced from an array of receivers of the downhole tool. The receivers spaced around a circumference of the downhole tool. The method also includes obtaining waveform data associated with the signals received at one or more of the receivers and processing the waveform data to determine three-dimensional slowness-time coherence representation of the waveforms. The example method also includes processing the waveform data comprises processing the waveform data using spatial positions of the receivers. In some examples, processing the waveform data includes stacking waveforms based on linear moveout and sinusoidal moveout.

In some examples, the linear moveout is associated with a source-receiver offset and the sinusoidal moveout is associated with receiver azimuth. In some examples, the sources are multi-pole sources, and processing the waveform data from the multi-pole sources is to reduce coherence between direct arrivals. In some examples, the sources are multi-pole sources, and processing the waveform data from the multi-pole sources includes using azimuths of the multi-pole sources. In some examples, processing the waveform data is to further determine parameters of one or more non-direct wavefronts. In some examples, the one or more non-direct wavefronts comprise the non-direct wavefronts having the highest coherence. In some examples, the one or more non-direct wavefronts includes local maxima in a coherence array associated with the waveform data.

In some examples, the method also includes constructing a ray tracing based on the parameters of the non-direct wavefronts. In some examples, the parameters include approximate arrival times and slowness in three spatial directions of the non-direct wavefronts. In some examples, the method also includes parameterizing the slowness in one or more of Cartesian coordinates, cylindrical coordinates, or spherical coordinates. In some examples, processing the waveform data includes processing the waveform data in substantially real time. In some examples, processing the waveform data includes processing the waveform data in substantially real time while drilling the formation. In some examples, the method also includes substantially removing a signature of a tool borne direct arrival using a semblance modification process. In some examples, when processing the wavefront data, a radial slowness is to be equal to a slowness of a direct compressional arrival.

Another example method includes transmitting a signal from a monopole source. The monopole source is spaced from an array of receivers of the downhole tool. The receivers are spaced around a circumference of the downhole tool. The method also includes obtaining waveform data associated with the signal received at one or more of the receivers and filtering the waveform data to substantially remove data associated with direct arrivals. The method also includes processing the filtered waveform data to determine three-dimensional slowness-time coherence representation of the waveforms and parameters of one or more non-direct wavefronts. In some examples, processing the filtered waveform data includes processing the filtered waveform data using spatial positions of the receivers. In some examples, processing the waveform data includes stacking waveforms according to linear moveout and sinusoidal moveout. In some examples, the one or more non-direct wavefronts includes local maxima in a coherence array associated with the waveform data.

An example apparatus includes one or more sources spaced from a receiver. The one or more sources are to transmit one or more signals and the receiver to receive at least a portion of the one or more signals. The apparatus includes a processor to process waveform data associated with the one or more signals by stacking waveforms of the waveform data based on to linear moveout and sinusoidal moveout. In some examples, the one or more sources include a plurality of multi-pole sources. The processor is to identify relative arrival times and slowness of non-direct wavefronts using the processed waveform data.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method, comprising:
    transmitting signals from a plurality of sources, the sources spaced from an array of receivers of the downhole tool, the receivers spaced around a circumference of the downhole tool;
    obtaining waveform data associated with the signals received at one or more of the receivers; and
    processing the waveform data to determine three-dimensional slowness-time coherence representation of the waveforms;
    wherein, when processing the wavefront data, a radial slowness is to be equal to a slowness of a direct compressional arrival.

2. The method of claim 1, wherein processing the waveform data comprises processing the waveform data using spatial positions of the receivers.

3. The method of claim 1, wherein processing the waveform data comprises stacking waveforms based on linear moveout and sinusoidal moveout.

4. The method of claim 3, wherein the linear moveout is associated with a source-receiver offset and the sinusoidal moveout is associated with receiver azimuth.

5. The method of claim 1, wherein the sources comprise multi-pole sources, and processing the waveform data from the multi-pole sources comprises using azimuths of the multi-pole sources.

6. The method of claim 1, wherein processing the waveform data is to further determine parameters of one or more non-direct wavefronts.

7. The method of claim 6, wherein the one or more non-direct wavefronts comprise the non-direct wavefronts having the highest coherence.

8. The method of claim 6, wherein the one or more non-direct wavefronts comprise local maxima in a coherence array associated with the waveform data.

9. The method of claim 6, further comprising constructing a ray tracing based on the parameters of the non-direct wavefronts.

10. The method of claim 6, wherein the parameters comprise approximate arrival times and slowness in three spatial directions of the non-direct wavefronts.

11. The method of claim 10, further comprising parameterizing the slowness in one or more of Cartesian coordinates, cylindrical coordinates, or spherical coordinates.

12. The method of claim 1, wherein processing the waveform data comprises processing the waveform data in substantially real time while drilling the formation.

13. The method of claim 1, further comprising substantially removing a signature of a tool borne direct arrival using a semblance modification process.

14. A method, comprising:
    transmitting a signal from a monopole source, the monopole source spaced from an array of receivers of the downhole tool, the receivers spaced around a circumference of the downhole tool;
    obtaining waveform data associated with the signal received at one or more of the receivers;
    filtering the waveform data to substantially remove data associated with direct arrivals; and
    processing the filtered waveform data to determine three-dimensional slowness-time coherence representation of the waveforms and parameters of one or more non-direct wavefronts;
    when processing the filtered wavefront data, a radial slowness is to be equal to a slowness of a direct compressional arrival.

15. The method of claim 14, wherein processing the filtered waveform data comprises processing the filtered waveform data using spatial positions of the receivers.

16. The method of claim 14, wherein the one or more non-direct wavefronts comprise local maxima in a coherence array associated with the waveform data.

17. An apparatus, comprising:
    one or more sources spaced from a receiver, the one or more sources to transmit one or more signals and the receiver to receive at least a portion of the one or more signals; and a processor to process waveform data associated with the one or more signals by stacking waveforms of the waveform data based on to linear moveout and sinusoidal moveout;

when processing the wavefront data, a radial slowness is to be equal to a slowness of a direct compressional arrival.

18. The apparatus of claim 17, wherein the one or more sources comprise a plurality of multi-pole sources.

19. The apparatus of claim 17, wherein the processor is to identify relative arrival times and slowness of non-direct wavefronts using the processed waveform data.

* * * * *